(12) United States Patent
Fransman et al.

(10) Patent No.: US 7,024,681 B1
(45) Date of Patent: Apr. 4, 2006

(54) METHOD AND APPARATUS FOR NEAR VIDEO ON DEMAND

(75) Inventors: Andrew Fransman, Sharon, MA (US); Renu Chipalkatti, Lexington, MA (US)

(73) Assignee: Verizon Laboratories Inc., Waltham, MA (US)

( * ) Notice: Subject to any disclaimer, the term of this patent is extended or adjusted under 35 U.S.C. 154(b) by 673 days.

(21) Appl. No.: 09/204,523

(22) Filed: Dec. 3, 1998

Related U.S. Application Data

(60) Provisional application No. 60/067,452, filed on Dec. 4, 1997, provisional application No. 60/070,106, filed on Dec. 31, 1997.

(51) Int. Cl.
*H04N 7/173* (2006.01)
*H04N 7/14* (2006.01)

(52) U.S. Cl. .................. 725/115; 725/116; 725/145; 725/93; 360/31

(58) Field of Classification Search .............. 348/7; 709/217, 219; 725/86–153; 360/31; 386/25
See application file for complete search history.

(56) References Cited

U.S. PATENT DOCUMENTS

| | | | | |
|---|---|---|---|---|
| 5,073,930 A | * | 12/1991 | Green et al. .................. 725/69 |
| 5,168,353 A | | 12/1992 | Walker et al. ................ 358/86 |
| 5,283,639 A | * | 1/1994 | Esch et al. .................... 455/3.1 |
| 5,311,423 A | | 5/1994 | Clark .......................... 364/401 |
| 5,383,112 A | * | 1/1995 | Clark ............................ 348/7 |
| 5,446,489 A | * | 8/1995 | Egendorf ....................... 725/1 |
| 5,499,046 A | * | 3/1996 | Schiller et al. ................ 348/6 |
| 5,576,755 A | * | 11/1996 | Davis et al. ................. 348/13 |
| 5,583,937 A | | 12/1996 | Ullrich et al. ................ 380/20 |
| 5,583,995 A | * | 12/1996 | Gardner et al. ................ 348/7 |
| 5,592,551 A | | 1/1997 | Lett et al. ..................... 380/20 |
| 5,629,733 A | | 5/1997 | Youman et al. ................ 348/7 |
| 5,631,693 A | | 5/1997 | Wunderlich et al. ........... 348/7 |
| 5,666,645 A | * | 9/1997 | Thomas et al. .............. 455/6.1 |
| 5,790,523 A | * | 8/1998 | Ritchie et al. .............. 725/106 |
| 6,088,816 A | * | 7/2000 | Nouri et al. .................. 714/31 |
| 6,119,109 A | * | 9/2000 | Muratani et al. ........... 705/400 |
| 6,119,163 A | * | 9/2000 | Monteiro et al. ........... 709/227 |

* cited by examiner

*Primary Examiner*—Christopher Grant
*Assistant Examiner*—Reuben M. Brown
(74) *Attorney, Agent, or Firm*—Leonard C. Suchyta, Esq.; Joseph R. Palmiera, Esq.; Finnegan, Henderson, Farabow, Garrett & Dunner LLP

(57) ABSTRACT

A master scheduler system and method automatically operate and/or coordinate operation of a plurality of relatively independent systems, including manual systems, to function as an NVOD system to provide automating diverse operations for supporting and maintaining an NVOD system. The master scheduler system and method may also be applied to automate manual processes of analog-based and digital broadcast based service. The master scheduler receives, processes, and disseminates NVOD schedule-related information for end-to-end NVOD service; that is, sending video from a back-end which stores video data to a head-end for viewing by a user. The master scheduler also provides operations support for the NVOD system, such as maintaining the head-end configuration, allocating channels, performing asset management, performing content management, etc. The master scheduler provides validation of scheduling information by comparing information such as programmed schedules, asset metadata, and data obtained by measuring asset parameters, for example duration.

18 Claims, 36 Drawing Sheets

FILE EDIT MANAGE CONFIGURE ADMINISTER REPORTS/LOGS

ITEMS

| ID | DESCRIPTION | EFFECTIVE DATE |
|---|---|---|
| 1 | ITEM #1 | 4/1/97 |
| 2 | ITEM #2 | 5/1/97 |
| 3 | ITEM #3 | 5/1/97 |

PORTS

| ID | DESCRIPTION | EFFECTIVE DATE |
|---|---|---|
| 1 | PORT #1 | 5/1/97 |
| 2 | PORT #2 | 5/1/97 |
| 3 | PORT #3 | 6/1/97 |
| 4 | PORT #4 | 6/1/97 |
| 5 | PORT #5 | 6/1/97 |

*FIG. 3*

_File Edit_ Manage Configure Administer Reports/Logs

| LINEUP NAME | LINEUP VERSION | STATUS |
|---|---|---|
| FEB LINEUP | 1 | FINALIZED |
| MARCH LINEUP | 4 | BEING DISTRIBUTED |
| APRIL LINEUP | 1 | WIP |
| | | |

| ORGANIZATION | DISTRIBUTED (Y/N) | DISTR. DATE | CONFIRMED (Y/N) | CONFIRM DATE | REMARKS |
|---|---|---|---|---|---|
| EPG | Y | 2/4/97 | Y | 2/5/97 | PHONE CALL FROM JOHN |
| BSS | Y | 2/5/97 | N | | SENT A FAX |
| | | | | | |
| | | | | | |

FIG. 4

```
--TO ENSURE UNIFORM SIZE OF DATA TYPES,          CREATE TABLE supplier_numbers (
WE USE SOME DOMAINS                              id          number(4,0) primary key,
-Small Id    -number(4,0)                        value       number(4,0) not null,
-Small Char  -Varchar2(15)                       name        varchar2(15) not null
-Med Char    -Varchar2(100)                      );
-Date        -Date
                                                 CREATE TABLE vci (
CREATE TABLE items (                             id          number(4,0) primary key,
id           number(4,0) primary key,            value       number(4,0) not null
description  varchar2(100) not null,             );
effective_date  date not null
);                                               CREATE TABLE status (
                                                 id          number(4,0) primary key,
CREATE TABLE frequencies (                       value       varchar(15) not null
id           number(4,0) primary key,            );
frequency    number(4,0) not null   --in MHz
);                                               CREATE TABLE channels(
                                                 id                  number(4,0) primary key
CREATE TABLE ports (                             epg_channel_name    varchar2(100) not null,
id           number(4,0) primary key,            bss_service_code    number(6,0) not null,
description  varchar2(100) not null,             stb_display_channel number(4,0) not null,
effective_date  date not null,                   dig_stream_id       number(4,0) not null references digital_streams,
freq_id number (4,0) not null references frequencies,  sup_num_id    number(4,0) not null references supplier_numbers,
item_id      number(4,0) not null references items     stat_id       number(4,0) not null references status
);                                               );

CREATE TABLE line_ups (
CREATE TABLE digital_streams (                   id          number(4,0) primary key,
id           number(4,0) primary key,            name        varchar2(15) not null,
value        number(4,0) not null,               version     varchar2(15) not null,
bit_rate     archar2(15) not null,               start_date_time date,
vpi          number(4,0) not null,               end_date_time date,
port_id      number(4,0) not null references ports,   stat_id    number(4,0) not null references status
vci_id       number(4,0) not null references vci );
);
```

FIG. 6

| ANALOG FREQUENCY | VCI (33-1024) | VPI (FIXED) | ITEM # | ITEM PORT | DIGITAL STREAM | BIT RATE | STB LED CHANNEL DISPLAY | EPG CHANNEL NAME | ITC PAL FILE NAME | SUPPLIER NUMBER | RELATIVE CHANNEL NUMBER | BSS. SERVICE CODE | SERVICE HANDLE (CODE +32K) |
|---|---|---|---|---|---|---|---|---|---|---|---|---|---|
| 666 MHz | 33 | 0 | 1 | 1 | 1 | 4.5Mbps | 201 | AT01 | V026mmyy | 026 | 1 | 801 | 33569 |
| 666 MHz | 34 | 0 | 1 | 1 | 2 | 4.5Mbps | 202 | AT02 | V026mmyy | 026 | 2 | 802 | 33570 |
| 666 MHz | 35 | 0 | 1 | 1 | 3 | 4.5Mbps | 203 | AT03 | V026mmyy | 026 | 3 | 803 | 33571 |
| 666 MHz | 36 | 0 | 1 | 1 | 4 | 4.5Mbps | 204 | AT04 | V026mmyy | 026 | 4 | 804 | 33572 |
| 666 MHz | 37 | 0 | 1 | 1 | 5 | 4.5Mbps | 205 | AT05 | V026mmyy | 026 | 5 | 805 | 33573 |
| 672 MHz | 38 | 0 | 1 | 2 | 1 | 4.5Mbps | 206 | AT06 | V026mmyy | 027 | 1 | 806 | 33574 |
| 672 MHz | 39 | 0 | 1 | 2 | 2 | 4.5Mbps | 207 | AT07 | V026mmyy | 027 | 2 | 807 | 33575 |
| 672 MHz | 40 | 0 | 1 | 2 | 3 | 4.5Mbps | 208 | AT08 | V026mmyy | 027 | 3 | 808 | 33576 |
| 672 MHz | 41 | 0 | 1 | 2 | 4 | 4.5Mbps | 209 | AT09 | V026mmyy | 027 | 4 | 809 | 33577 |
| 672 MHz | 42 | 0 | 1 | 2 | 5 | 4.5Mbps | 210 | AT10 | V026mmyy | 027 | 5 | 810 | 33578 |
| 678 MHz | 43 | 0 | 1 | 3 | 1 | 4.5Mbps | 211 | AT11 | V026mmyy | 028 | 1 | 811 | 33579 |
| 678 MHz | 44 | 0 | 1 | 3 | 2 | 4.5Mbps | 212 | AT12 | V026mmyy | 028 | 2 | 812 | 33580 |
| 678 MHz | 45 | 0 | 1 | 3 | 3 | 4.5Mbps | 213 | AT13 | V026mmyy | 028 | 3 | 813 | 33581 |
| 678 MHz | 46 | 0 | 1 | 3 | 4 | 4.5Mbps | 214 | AT14 | V026mmyy | 028 | 4 | 814 | 33582 |
| 678 MHz | 47 | 0 | 1 | 3 | 5 | 4.5Mbps | 215 | AT15 | V026mmyy | 028 | 5 | 815 | 33583 |
| 684 MHz | 48 | 0 | 1 | 4 | 1 | 4.5Mbps | 216 | AT16 | V026mmyy | 029 | 1 | 816 | 33584 |
| 684 MHz | 49 | 0 | 1 | 4 | 2 | 4.5Mbps | 217 | AT17 | V026mmyy | 029 | 2 | 817 | 33585 |
| 684 MHz | 50 | 0 | 1 | 4 | 3 | 4.5Mbps | 218 | AT18 | V026mmyy | 029 | 3 | 818 | 33586 |
| 684 MHz | 51 | 0 | 1 | 4 | 4 | 4.5Mbps | 219 | AT19 | V026mmyy | 029 | 4 | 819 | 33587 |
| 684 MHz | 52 | 0 | 1 | 4 | 5 | 4.5Mbps | 220 | AT20 | V026mmyy | 029 | 5 | 820 | 33588 |
| 690 MHz | 53 | 0 | 1 | 5 | 1 | 4.5Mbps | 221 | AT21 | V026mmyy | 030 | 1 | 821 | 33589 |
| 690 MHz | 54 | 0 | 1 | 5 | 2 | 4.5Mbps | 222 | AT22 | V026mmyy | 030 | 2 | 822 | 33590 |
| 690 MHz | 55 | 0 | 1 | 5 | 3 | 4.5Mbps | 223 | AT23 | V026mmyy | 030 | 3 | 823 | 33591 |
| 690 MHz | 56 | 0 | 1 | 5 | 4 | 4.5Mbps | 224 | AT24 | V026mmyy | 030 | 4 | 824 | 33592 |
| 690 MHz | 57 | 0 | 1 | 5 | 5 | 4.5Mbps | 225 | AT25 | V026mmyy | 030 | 5 | 825 | 33593 |

*FIG. 7*

| HEADER Record |
|---|
| SERVICE (Channel) Record |
| PROGRAM Record |
| EVENT Record |
| EVENT Record |
| EVENT Record |
| SERVICE (Channel) Record |
| PROGRAM Record |

*FIG. 8*

FILE EDIT MANAGE CONFIGURE ADMINISTER REPORTS/LOGS

| NAME | FEB SCHEDULE - VERSION 2 | STATUS | ACTIVE |

| NVOD 1 | TOY STORY EVERY 15 MINUTES |
| NVOD 2 | MISSION IMPOSSIBLE EVERY 30 MINUTES |
| NVOD 3 | DENNIS EVERY 60 MINUTES |

FEB 6  FEB 7  FEB 8  FEB 9  FEB 10  FEB 11

PREV MONTH    NEXT MONTH

FILE EDIT MANAGE CONFIGURE ADMINISTER REPORTS/LOGS

| NAME | MAY SCHEDULE - VERSION 2 | STATUS | WIP |

MAY 8, 1997

| | | |
|---|---|---|
| NVOD 1 | TOY STORY | JULIA CHILD |
| NVOD 2 | NBA PLAYOFFS | MISSION IMPOSSIBLE |
| WCBS | DENNIS | STAR WARS |

6PM  6:30PM  7PM  7:30PM  8PM  8:30PM

| MONTH BEGIN | PREV DAY | NEXT DAY | MONTH END |

FILE EDIT MANAGE CONFIGURE ADMINISTER REPORTS/LOGS

178

| TITLE | GONE WITH THE WIND ▽ | FROM | 2/16/97 | 12:00AM | INTERVAL | 6:00PM |
| --- | --- | --- | --- | --- | --- | --- |
| PRICE | $2.95 | TO | 3/16/97 | 12:00PM | TO | 11:00PM |

| DATE | STARTING TIME | STB DISPLAY | CHANNEL NAME | CURRENT PRICE |
| --- | --- | --- | --- | --- |
| 2/16/97 | 9:30PM | 202 | NVOD1 | 3.25 |
| 2/18/97 | 10:00PM | 203 | NVOD2 | 2.25 |

SELECT ALL

UPDATE PRICE

*FIG. 12*

FILE EDIT MANAGE CONFIGURE ADMINISTER REPORTS/LOGS

| SCHEDULE | VERSION | STATUS |
|---|---|---|
| FEBRUARY SCHEDULE | 1 | FINALIZED |
| MARCH SCHEDULE | 1 | WIP |

| ORGANIZATION | DISTRIBUTED (Y/N) | DISTR. DATE | CONFIRMED (Y/N) | CONFIRM DATE | REMARKS |
|---|---|---|---|---|---|
| EPG | Y | 2/4/97 | Y | 2/5/97 | PHONE CALL |
| BSS | Y | 2/5/97 | N | | FROM JOHN |
| VIDEO SERVER | Y | 2/3/97 | Y | 2/3/97 | SENT A FAX |

[BEGIN DISTRIBUTION]

TAPE OPERATIONS

[EDIT MODE]

View Mode / Edit Mode / Refresh / Print / Save / Input Data / Delete Record / First Record / Previous Record / Next Record / Last Record

TAPE DATA

| BARCODE | TAPE NAME | LOCATION | STATUS | SCHEDULED TO BE LOADED? |
|---------|-----------|----------|--------|--------------------------|
| AB | AB | SLOT01:Xrated:floor2: | RECEIVED | NO |
| 123455 | 123455-NAME UNKNOWN | SLOT01:shelf1:floor1:M | CORRUPT | NO |
|  |  |  |  |  |
|  |  |  |  |  |
|  |  |  |  |  |
|  |  |  |  |  |

TAPE DETAILS

BARCODE: _____
TAPE NAME: _____
LOCATION: _____  [AUTO GENERATE] [BROWSE]
COMMENTS: _____

[OK]  [CANCEL]

---

- RECEIVE TAPE
- CHECK IN
- CHECK OUT
- RETURN TAPE
- MARK AS CORRUPT
- GENERATE CONFIGURATION LETTER
- MOVE TAPE
- SEARCH
- BROWSE LIBRARY
- GENERATE RETURN LETTER
- SHOW HISTORY
- SHOW ASSET MAETADATA

| | |
|---|---|
| FILE EDIT SCHEDULE CONTENT TASKS CONFIGURE ASSET | |

[TAPE OPERATIONS]  
[EDIT MODE]

VIEW MODE / EDIT MODE / REFRESH DATA / PRINT / SAVE / INPUT RECORD / DELETE RECORD / FIRST RECORD / PREVIOUS RECORD / NEXT RECORD / LAST RECORD

| | |
|---:|---|
| NAME | WONDER 3 |
| TOTAL BITRATE | 6000000 |
| SOURCE | 2 |
| PROVIDER ASSET ID | WONDER3 |
| DURATION | 30 |
| SHIPPED DATE/TIME | 03/30/1997 12:00:00AM |
| LOAD DATE/TIME | 03/31/1997 12:00:00AM |
| RETURN DATE/TIME | 05/30/1997 12:00:00AM |
| BARCODE | BARCODE 15 |
| ASSET METADATA SIZE | 6000000 |
| RETURN INSTRUCTIONS | ASSET RETURN INSTRUCTIONS FOR ADVENTURES EPISODES |
| OTHER INSTRUCTION | OTHER INSTRUCTIONS FOR ADVENTURES 3 |

*FIG. 20*

FILE EDIT MANAGE CONFIGURE ADMINISTER REPORTS/LOGS

302

DELETE RECORDS   FROM  1/16/97

TO  2/16/97

| TABLE NAME | EARLIEST DATE | NUMBER OF RECORDS MARKED FOR DELETION |
|---|---|---|
| PROGRAMS | 2/1/97 | 345 |
| EVENTS | 2/1/97 | 2765 |
| TASKS | 2/3/97 | 125 |

SUBMIT

*FIG. 31*

FILE  EDIT  MANAGE  CONFIGURE  ADMINISTER  REPORTS/LOGS

SCHEDULE

| NAME | VALUE |
|---|---|
| DEFAULT PRICE | 2.95 |
| MINIMUM DISTRIBUTION TIME TO TVDATA | 12 (HOURS) |
| MINIMUM DISTRIBUTION TIME TO BSS | 8 HOURS |

HARDWARE CONFIGURATION

| NAME | VALUE |
|---|---|
| MAXIMUM VCI | 999 |
| MAXIMUM STB DISPLAY CHANNEL | 999 |
| MAXIMUM CHANNEL FREQUENCY | 800(MHz) |

CONTENT

| NAME | VALUE |
|---|---|
| MINIMUM LOADING TIME | 2.95 |
| | 12 (HOURS) |
| | 8 HOURS |

| FUNCTIONAL AREA | DESCR | RECOMMENDED START DATE | EST. DURATION | DEADLINE | STATUS | ACTUAL START DATE | ACTUAL END DATE | PROGRESS STATUS |
|---|---|---|---|---|---|---|---|---|
| CONTENT MGMT | LOAD "STAR WARS" ON DATA SOURCES 2 | 2/25/97 | 1 HOUR | 3/1/97 | URGENT | | | NO ACTION |
| CONTENT MGMT | LOAD 'TOY STORY' ON DATA SOURCE 1 | 3/1/97 | 6 HOURS | 3/10/97 | SCHEDULED | | | NO ACTION |
| SCHEDULE MGMT | DISTRIBUTE APRIL SCHEDULE (VERSION 1) TO BSS | 2/24/97 | 1 HOUR | 3/11/97 | SCHEDULED | 2/24/97 | | WIP |

FIG. 35

METHOD AND APPARATUS FOR NEAR VIDEO ON DEMAND

This application claims the benefit of the filing dates of provisional patent application No. 60/067,452, filed Dec. 4, 1997, and provisional patent application No. 60/070,106, filed Dec. 31, 1997, both of which are incorporated herein by reference.

BACKGROUND OF THE INVENTION

1. Field of the Invention

This disclosure relates generally to the field of video distribution over a network, and in particular to a scheduling apparatus and method for providing near video on demand over a distribution network.

2. Description of Related Art

When using a near-video-on-demand (NVOD) system, a user such as a subscriber has the opportunity to purchase or rent videos such as movies, including recent hit movies, using a broadcast technique known as staggered start. In a staggered start video distribution, a plurality of video signals, each of which corresponds to a single movie, is transmitted on multiple channels, with the beginning of each video signal starting at a different time. For movies with fixed play times, such different start times effectively stagger the movies by a short amount.

For example, the staggering time may be about fifteen minutes. Without staggering, a user has to wait for a movie to finish, which may be over two hours. Using staggering, a user waits, at most, only fifteen minutes; that is, the stagger time. For typical movies lasting about two hours (120 minutes), a staggered video distribution needs about 120 minutes/15 minutes of stagger time per channel=eight channels. Using multiplexing techniques, a plurality of staggered movies may be interleaved to transmit over the at least eight channels.

NVOD systems typically use a back-end processing system which initiates and coordinates NVOD video scheduling, as well as performing remote schedule retrieval, schedule validation, schedule error handling, schedule distribution, video service content management, event process modification, and downstream digital channel allocation. Such operations are typically used for other digital broadband services, such as video on demand (VOD), home shopping, and video conferencing.

Video distribution systems in the prior art implement VOD and NVOD, as well as staggered video distribution. For example, video distribution systems for storing, managing, and transmitting videos to a plurality of subscribers are described in commonly assigned U.S. Pat. No. 5,168,353 to Walker et al.; U.S. Pat. No. 5,311,423 to Clark; U.S. Pat. No. 5,383,112 to Clark; and U.S. Pat. No. 5,583,937 to Ullrich et al., which are incorporated herein by reference. Typically, such video distribution systems have a master scheduler connected to a video server, a billing computer, and optionally a downstream controller. The master scheduler sends a schedule in the form of, for example, a schedule file or database, to the video server, which in turn responds to the schedule to distribute videos.

Heretofore, such scheduling has been limited to scheduling videos and transferring billing and customer requests to the video server. Other aspects of a video distribution system have generally not been automated, with various independent systems handling specific operations without coordination.

A need exists for a video distribution system to provide operational support for an NVOD system, for example, to track the head-end configuration; to perform schedule revision, management and distribution; and to perform asset and content management.

SUMMARY OF THE INVENTION

It is recognized herein that automating diverse operations for supporting and maintaining NVOD systems is necessary for the efficient operation of such NVOD systems. A master scheduler system and method are disclosed which automatically operate and/or coordinate operation of a plurality of relatively independent systems, including manual systems, to function in unison as an NVOD system. The disclosed master scheduler system and method may also be applied to automate manual processes of analog-based and digital broadcast-based service.

The master scheduler receives, processes, and disseminates NVOD schedule-related information for end-to-end NVOD service; that is, sending video from a video server which provides video data to a head-end distribution system for delivery to and subsequent viewing by a user. The master scheduler also provides operational support for the NVOD system, such as tracking the head-end configuration; performing schedule revision, management and distribution; and performing asset and content management, etc.

In the prior art, scheduling information was typically keyed in manually. Video tapes were played according to the scheduling information. Since a video tape had to be played to determine the duration of the video program recorded on the video tape, the duration of the video program could not be confirmed prior to playing of the video tape. Also, since each playing of an analog video tape tends to degrade the quality of the recorded video program, attempting to play the video tape in advance so as to determine the duration of the video program has the negative side effect of greatly accelerating tape degradation.

Without being able to confirm the duration of the video programs to be shown, the prior art systems cannot validate the scheduling information, i.e. they cannot confirm that the video programs will, when played according to the scheduling information, provide continuous video program material without temporal gaps and without temporal overlap.

Also, the prior art systems do not provide for propagation of information, such as billing information, program guide information, and factoid information (specific factual information relating to a video program, such as the actors and actresses, the year in which the video program was created, any awards the video program may have won, etc.), from an asset provider to various systems, such as a business support system, an electronic program guide system, and a factoid provider system.

Embodiments of the present invention are able to provide for reception, modification, validation, and propagation of scheduling information and for propagation of information, such as billing information, program guide information, and factoid information to various systems. Embodiments of the invention also allow coordination between these various systems and modification of information in a manner that ensures consistency of the information among the various systems. Embodiments of the invention allow easier performance of administrative functions by avoiding the need for extensive manual entry of information and entry of information into multiple systems.

BRIEF DESCRIPTION OF THE DRAWINGS

The features of the disclosed master scheduler system and method are readily apparent and are to be understood by referring to the following detailed description of the preferred embodiments of the present invention, taken in conjunction with the accompanying drawings, in which:

FIG. 3 illustrates a GUI screen for configuring the hardware of the head-end;

FIG. 4 illustrates a GUI screen for configuring the distribution status of the head-end;

FIG. 6 illustrates sample code for configuring the master scheduler;

FIG. 7 illustrates an NVOD end-to-end channel map;

FIG. 8 illustrates a data file structure;

FIG. 10 illustrates a GUI screen for managing blocks of portions of schedules;

FIG. 11 illustrates a GUI screen for managing programs in schedules;

FIG. 12 illustrates a GUI screen for managing price changes of scheduled events;

FIG. 13 illustrates a GUI screen for managing the status and distribution of schedules;

FIG. 19 illustrates a GUI screen for asset management;

FIG. 20 illustrates a GUI screen for accessing asset metadata;

FIG. 31 illustrates a GUI screen for purging records;

FIG. 32 illustrates a GUI screen for editing system parameters;

FIG. 35 illustrates a GUI screen for managing tasks.

DESCRIPTION OF THE PREFERRED EMBODIMENTS

Figure 1:
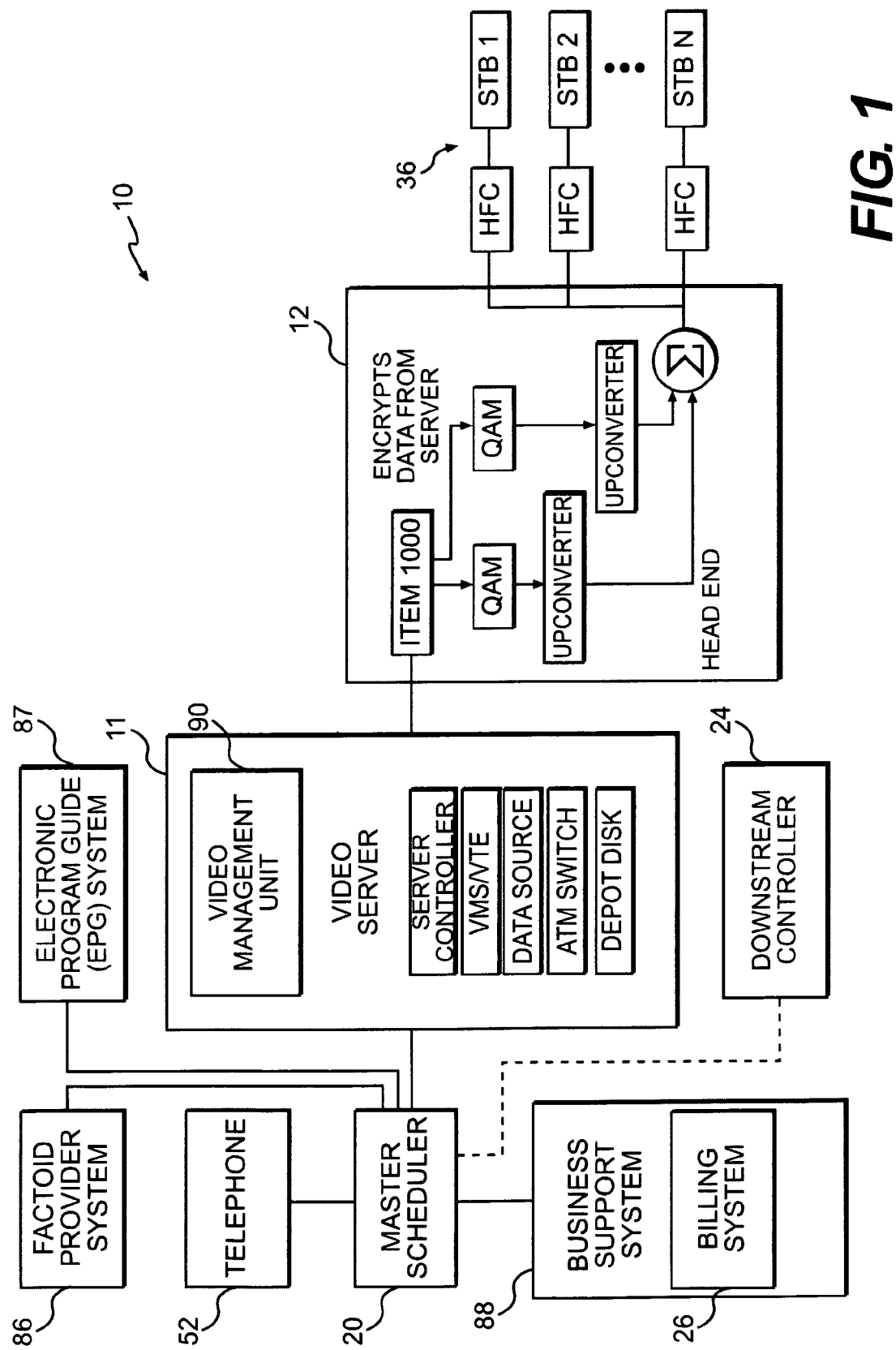
FIG. 1 illustrates one specific illustrative embodiment of an NVOD system using a master scheduler in accordance with our invention.

Referring in specific detail to the drawings, with common reference numbers identifying similar or identical elements, steps, and features, as shown in FIG. 1, the present disclosure describes an NVOD system 10 having a master scheduler 20 and method for scheduling and operating various functions of the NVOD system 10. For example, the master scheduler 20 receives, processes, and disseminates NVOD schedule-related information for end-to-end NVOD service; that is, for sending video from a video server which provides video data to a head-end distribution system for delivery to and subsequent viewing of a user. The master scheduler also provides operational support for the NVOD system 10, such as tracking the head-end configuration; performing schedule revision, management and distribution; and performing asset and content management, etc.

As shown in FIG. 1, the master scheduler 20 is connected to a video server 11 which is, in turn, connected to a head-end 12 of the NVOD system 10. In a preferred embodiment, the video server 11 is a "HEWLETT-PACKARD" (HP) "MEDIASTREAM" server, a commercially available video server for transferring and processing video data to a plurality of subscribers 36. One embodiment of video server 11 may include a server controller, a VMS/VTE interface, a data source, an ATM switch, and a depot disk. The VMS/VTE interface allows interaction with a video management unit 90, for example, a Hewlett-Packard "Video Transfer Engine" (VTE) video management unit. The ATM switch controls transfer of data over a medium, for example, an asynchronous transfer mode (ATM) network. The master scheduler 20 may optionally be connected to a downstream controller 24 which may be connected to or be included with the head-end 12.

One embodiment of head-end 12 may comprise a video stream processing device, for example the ITEM 1000, which is commercially available from General Instruments, 101 Tournament Drive, Horsham, Pa. 19044. The video stream processing device receives video streams from the video server 11, for example, high-bandwidth MPEG-2 video streams over an OC-3 fiber optic medium, and generates multiple smaller streams suitable for quadrature amplitude modulation (QAM) transmission. For example, the OC-3 fiber optic medium may have an overall payload capacity of approximately 120 Mbps. The video streams passed through the OC-3 fiber optic medium may each have a data rate of approximately 4.5 Mbps. According to this example, each of the multiple smaller QAM video streams may have an overall payload capacity of approximately 27 Mbps for transmitting one or more of the 4.5 Mbps video streams. The video stream processing device also encrypts video data from video server 11 and passes encrypted video data to the plurality of QAM's.

The head-end 12 may also comprise a plurality of quadrature amplitude modulators (QAM's), a plurality of upconverters, and a summer (Σ). The QAM's provide a signal modulated with the encrypted video data to the plurality of upconverters. The upconverters convert the frequency of the modulated signal and provide upconverted signals to a summer. The summer combines the upconverted signals from the upconverters for distribution. The head-end 12, in turn, is functionally connected to a plurality of subscribers 36 having appropriate video viewing devices, such as set-top boxes (STBs) and descramblers. In one embodiment of the invention, the video viewing devices may be coupled to the head-end 12 using a hybrid fiber coax (HFC) medium.

The master scheduler 20 may also connected to a communication device, such a telephone 52 and/or modem to other systems, and to a business support system (BSS) 88 which may include a billing system 26, as in the systems described in the patents incorporated herein. As illustrated in FIG. 1, the master scheduler 20 may be configured with certain external components, for example those such as are present in the systems described in commonly assigned U.S. Pat. No. 5,168,353 to Walker et al.; U.S. Pat. No. 5,311,423 to Clark; U.S. Pat. No. 5,383,112 to Clark; and U.S. Pat. No. 5,583,937 to Ullrich et al., which are incorporated herein by reference.

In addition, the NVOD system 10 may include a video management unit 90 connected to the video server 11, to allow an administrator to perform content management tasks, as described herein.

Figure 2:
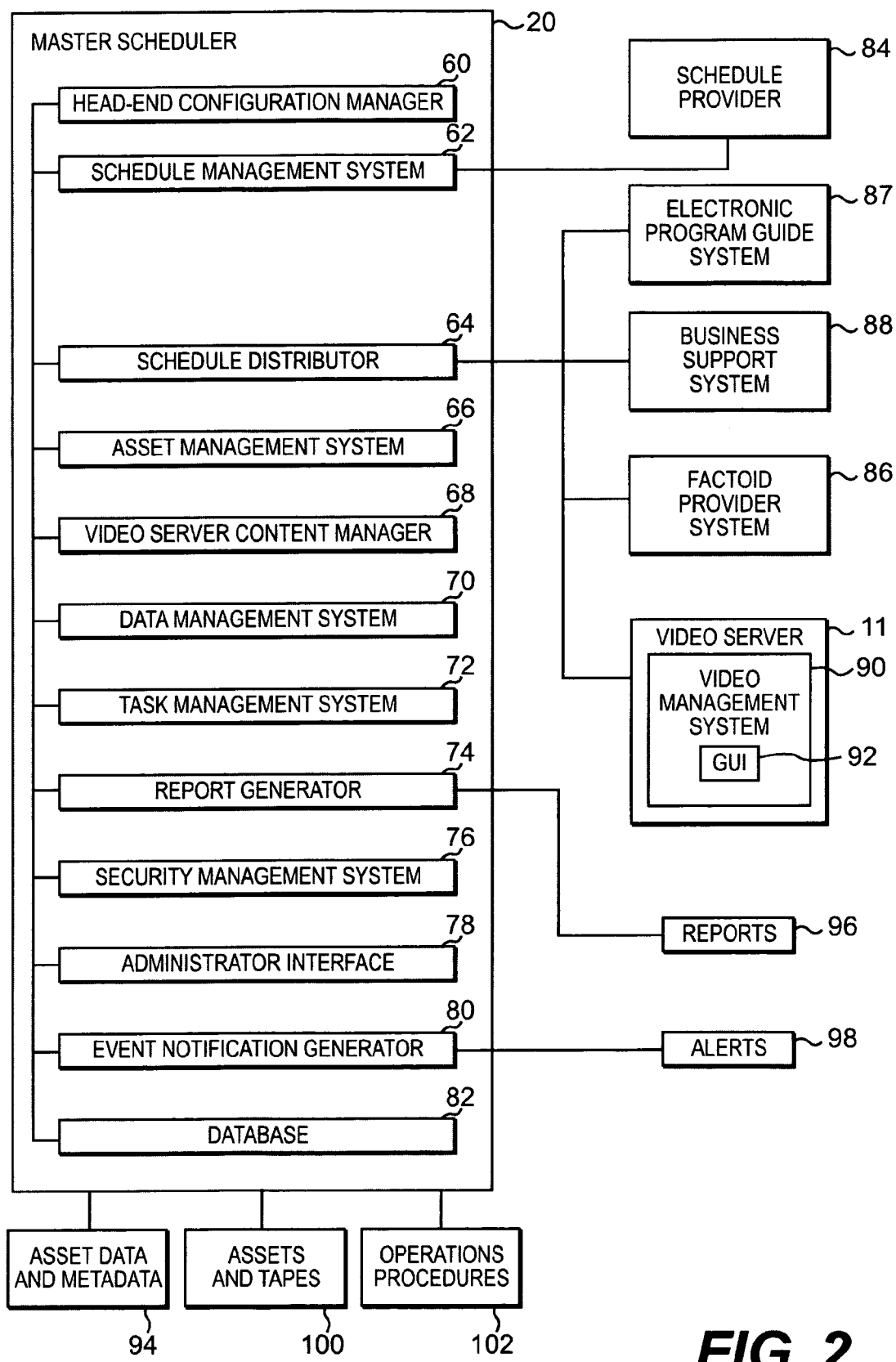
FIG. 2 illustrates the disclosed master scheduler in greater detail.
Figure 5A:
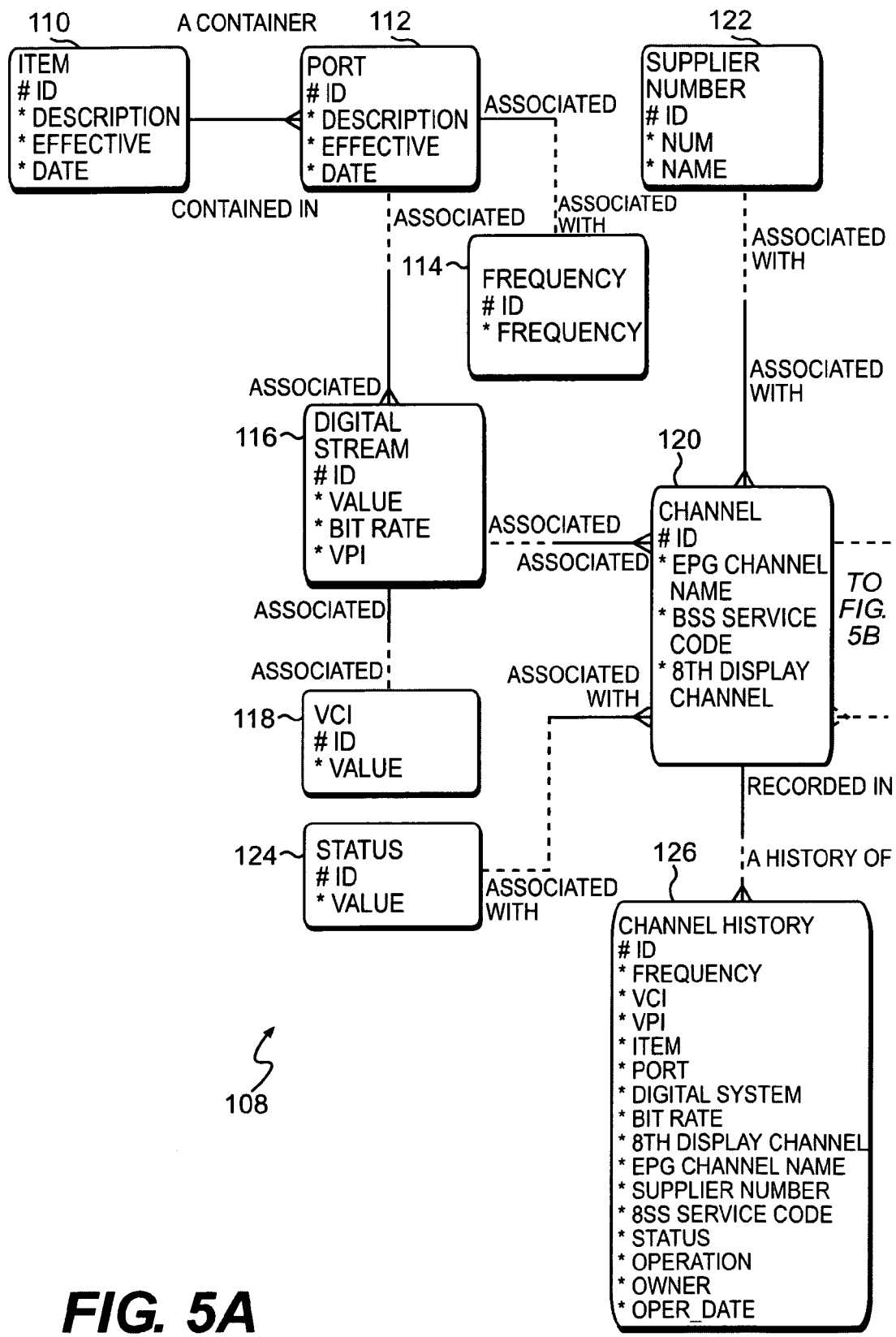
FIGS. 5A, 5B, 5C, and 5D illustrate an information model for the master scheduler.
Figure 5B:
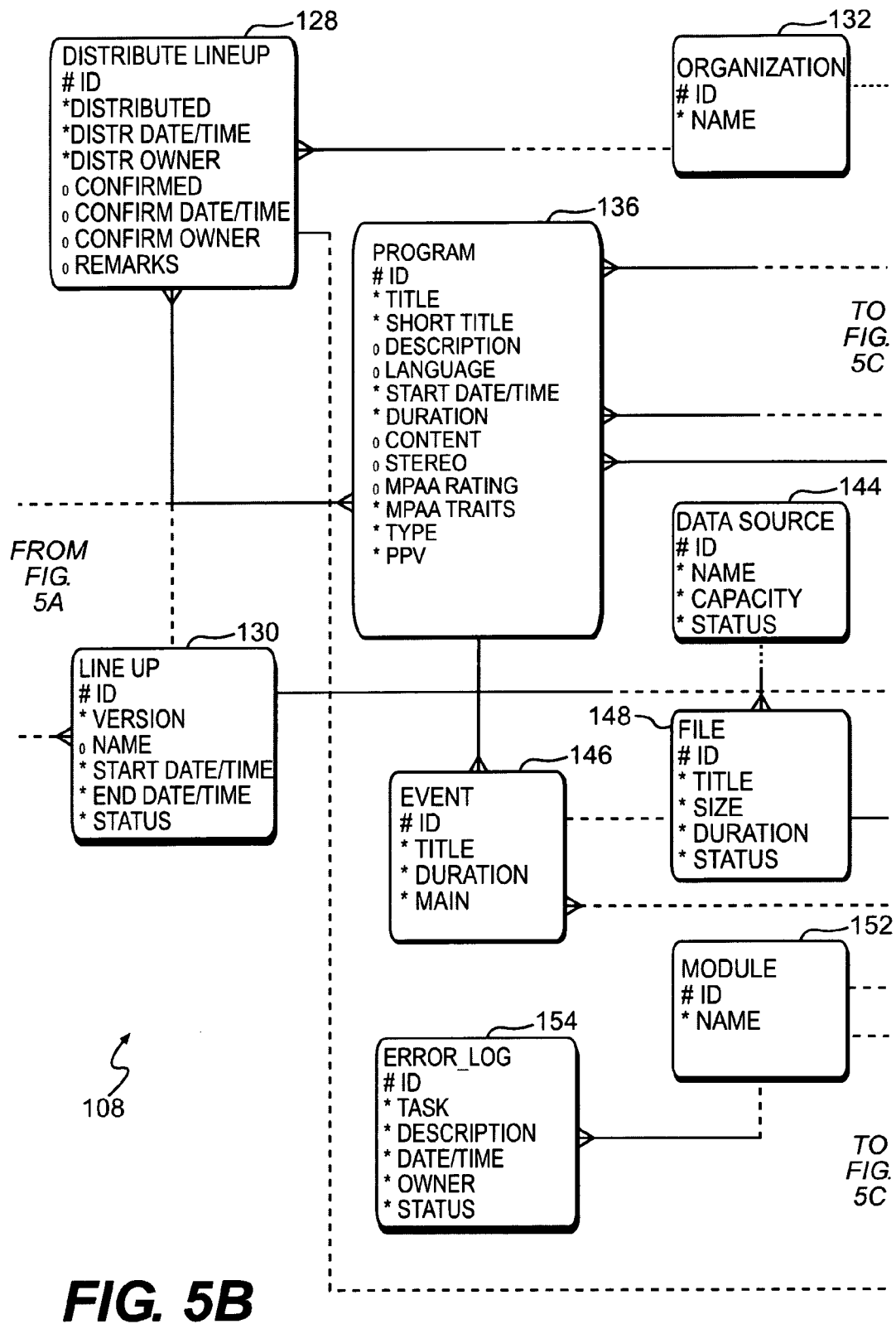
Figure 5C:
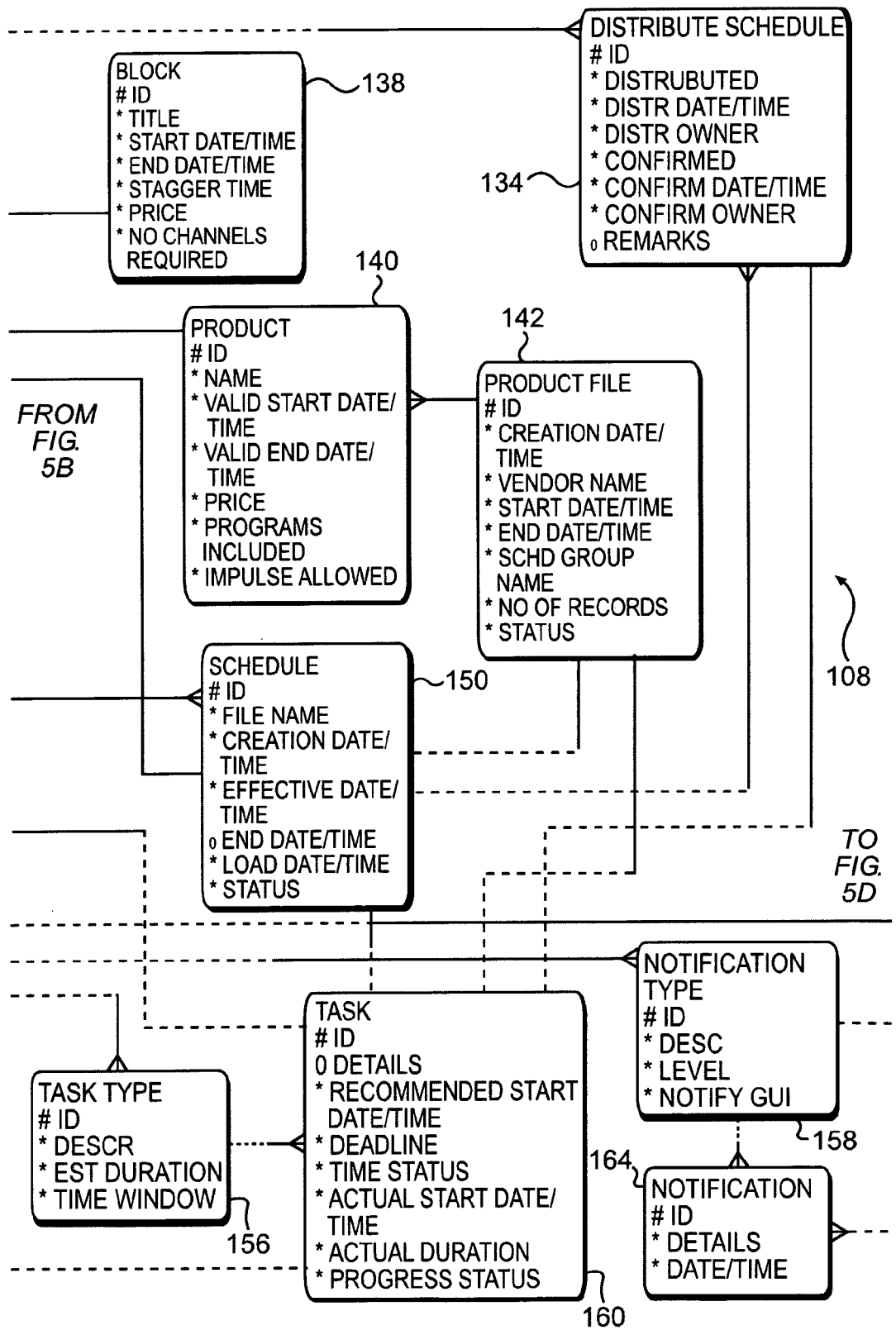
Figure 5D:
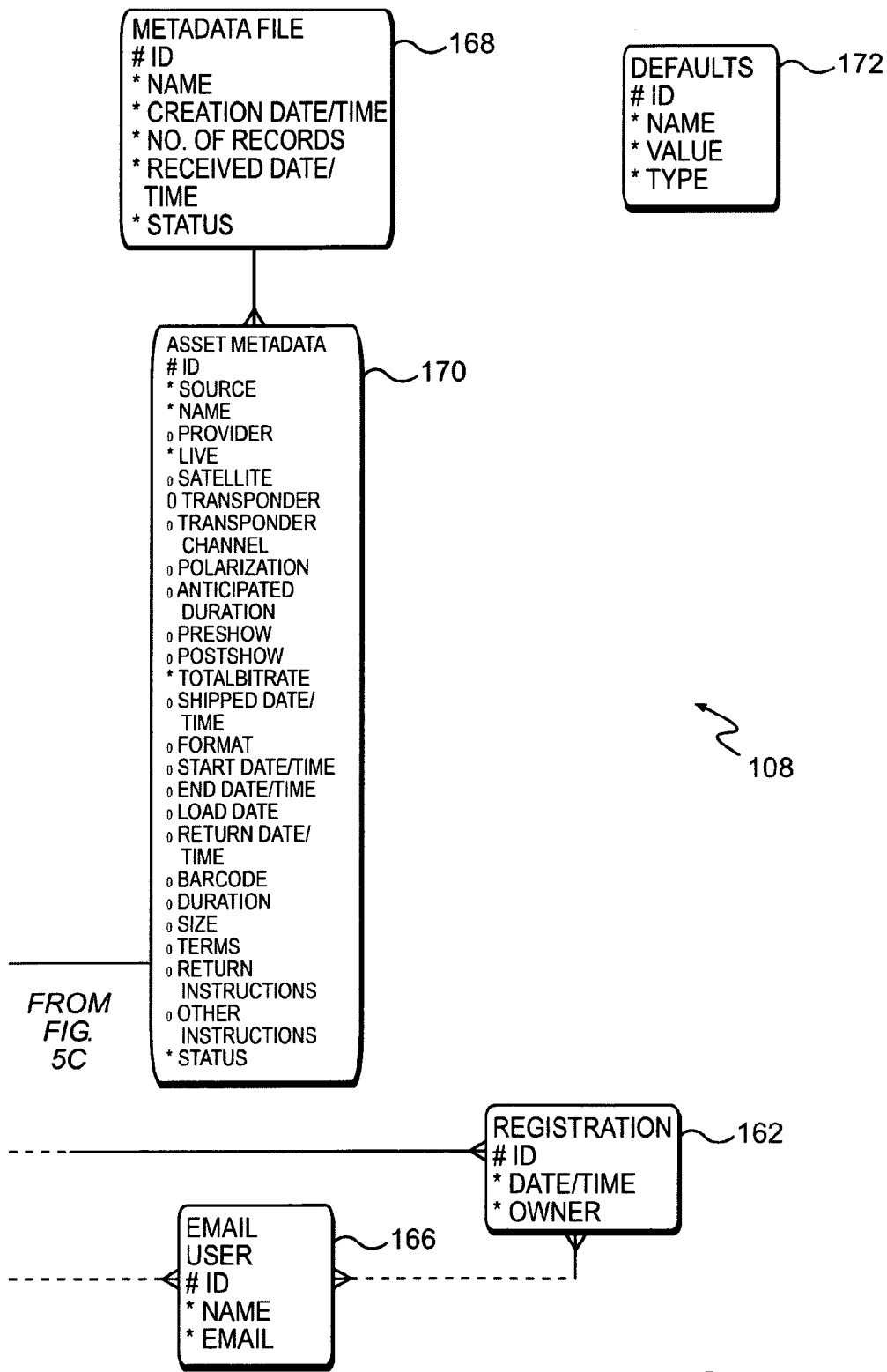

As shown in FIG. 2, the master scheduler 20 includes the following components for performing specific functions: a head-end configuration manager 60, a schedule management system 62, a schedule distributor 64, an asset management system 66, a video server content manager 68, a data management system 70, a task management system 72, a report generator 74, a security management system 76, an administrator interface 78, an event notification generator 80, and a memory such as a database 82.

In addition to the components shown in FIG. 1, the master scheduler 20 is functionally connected to a schedule provider 84, a factoid provider system 86, and the business support system (BSS) 88. A provider 94 of asset data and metadata (i.e., data descriptive of the asset data) is functionally connected to the master scheduler 20, and the video management unit 90, which is a computer and/or processor having a graphic user interface (GUI) 92, is connected to the video server 11. In particular, the video management unit 90, which may be a "VTE" management system available from "HEWLETT-PACKARD", is used by an operator who receives information from the administrator interface 78 of the master scheduler, as shown in FIGS. 1–2. The video management unit 90 may be remotely disposed relative to the master scheduler 20, and so both the video management unit 90 and the administrator interface 78 may include components such as computer expansion cards to perform telecommunication protocols, such as TCP/IP, between the master scheduler 20 and the video server 11.

The master scheduler 20 also generates reports 96 and alerts 98, accesses various available assets and tapes 100, and performs operations procedures 102.

The master scheduler 20 and the components thereof shown in FIG. 2 may be implemented in hardware and/or software, for example, as a master scheduler application (MSA), which may be a software program with source code written, for example, in C++, or other appropriate programming languages.

Head-End Configuration Management

Using the database 82, the master scheduler 20 stores and maintains head-end configuration data, which is used by the head-end configuration manager 60. The head-end configuration manager 60 is used to track the addition, deletion, modification, tracking, planning, viewing, and reporting of the head-end configuration information, including physical as well as logical channel parameters.

FIG. 3 illustrates a GUI screen 104 for configuring the hardware of the head-end, which provides lists, scrollable lists, and descriptions of available items, such as channels and data providers, which may be activated on predetermined effective dates. In addition, the ports for such channels may be activated on predetermined effective dates. Such items and ports may have associated identification (ID) numbers.

FIG. 4 illustrates a GUI screen 106 for configuring the distribution status of the head-end, in which lists, such as scrollable lists, of schedule line-ups and versions thereof may be displayed with the status of the distribution of each line-up. In addition, lists of data organizations such as the factoid provider 86, which provides factual information regarding video programs, and the BSS 88 may be displayed with the status of the distribution to or from the NVOD system 10, as well as confirmation dates and comments.

The master scheduler 20 manages and controls the flow of information to and from the NVOD 10. As shown in FIGS. 5A, 5B, 5C, and 5D, an information model 108 for the master scheduler 20 provides structural and functional relationships between elements and data. The information model 108 may be implemented using predetermined records or tables stored in memory, such as in the database 82. Alternatively, the information model 108 may be implemented as objects and classes using object-oriented programming.

Each of the elements 110–172 includes at least one field. For example, each of the elements 110–172 includes an associated ID, which may be alphanumeric. In addition, each item element 110 and each port element 112 includes a description field and an effective date field. Also, each item element 110 may be contained in the record or object of a port element 112. Each port element 112 includes a frequency ID number and an item ID number. Each frequency element 114 includes a frequency value, and is associated with a respective port element 112. Each digital stream element 116 includes a value field, a bit rate field, a virtual port ID (VPI) field, a port ID field, and a virtual circuit ID (VCI) field. In addition, each digital stream element 116 is associated with a respective port element 112. Also, each VCI element 118 is associated with a value field.

Each channel element 120 includes an electronic programming guide (EPG) channel name field, a BSS service code field, and a set-top box (STB) display channel field, as well as a digital stream ID field, a supplier number field, and a status ID field. In addition, each channel element 120 is associated with a respective digital stream element 116. Each supplier element 122 includes a supplier value field and a supplier name field, and is associated with a channel element 120. Each status element 124 includes a status field and is associated with a channel element 120. Each channel history element 126 includes a port indicator, a digital stream indicator, a bit rate field, a display channel field, a channel name, a supplier number, a status field, and an operative date.

Each distribute line-up element 128 includes a distribution status field, a distribution date/time, a distribution owner, a confirmation status field, a confirmation date/time, a confirmation owner, and a remarks text message. Each line-up element 130 includes a vendor name field, a version number field, a start date/time, an end date/time, and a status ID field. Each organization element 132 includes a name field, and each distribute schedule element 134 includes a distribution status indicator, a distribution date/time, a distribution owner indicator, a confirmation status field, a confirmation date/time, a confirmation of owner value and a remarks text message.

Each program element 136 includes a title field, a short title field, a description field, a language indicator, a start date/time, a duration value, a content indicator, a stereo status indicator for stereo audio transmissions, a Motion Picture Association of America (MPAA) rating indicator, an MPAA traits indicator such as indicating violent content, a type field, and a pay-per-view indicator.

Each block element 138 includes a title, a start date/time, an end date/time, a stagger time duration, a price value, and an indication that no channels are required for a given asset. Each product element 140 includes a name, a valid start date/time, a valid end date/time, a price value, an indicator that programs are included with the product, and an indicator that an impulse signal is allowed. A product file element 142 includes a creation date/time, a vendor name, a start date/time, an end date/time, a schedule (SCHD) group name, a value indicating a number of records, and a status field.

Each module element 152 includes a name field, and each error log element 154 includes a task field, a description field, a date/time, an owner field, and a status field. Each task type element 156 includes a task duration field and a time window field. Each notification type element 158 includes a demo field, a level field and a notification field. Each task element 160 includes a details field, a recommended start date/time field, a deadline field, a time status field, an actual start date/time, an actual duration field, and a progress status field to indicate how long into the duration of the task that the task is currently situated.

Each registration element 162 includes a date/time field and an owner field. Each notification element 164 includes a details field and a date/time field. Each E-mail user element 166 includes a name field and an E-mail address field. Each metadata file field 168 includes a name field, a creation date/time field, a number of records field, a received date/time field, and a status field. Each asset metadata element 170 includes a source field, a name field, a provider field, a live field indicating whether the asset is recorded from a live event, a satellite field, a transponder field, a transponder channel field, a polarization field, an anticipated duration field, a pre-show field, a post-show field, a total time field, a shipped date/time field, a format field, a start date/time field, an end date/time field, a load date field, and a return date/time field.

In addition, the asset metadata element 170 includes a barcode field, a duration field, an age field, a return restriction field, an owner restriction field, and a status field. Also, a default element 172 includes a name field, a value field, and a type field.

Such elements 110–172 may be programmed, for example, using C++ for configuring the master scheduler 20 to handle such data elements 110–172, and a sample of such code is shown in FIG. 6.

FIG. 7 illustrates an NVOD end-to-end channel map generated by configuration of the head-end 12 as described above to have predetermined allocations of analog frequencies, VCIs, VPIs, item numbers, item ports, digital streams, bit rates, etc.

In a memory, for example, the database 82, the master scheduler 20 stores and maintains the head-end configuration, including both physical and logical channel line-up information in order to link scheduled content with the delivery channels of the NVOD system 10, as well as to validate and distribute the schedule. The head-end configuration information is used by various components of the master scheduler 20, such as the components 62, 64, 68, for providing the appropriate data for scheduling programming events and for displaying program listings.

The channel line-up information includes two types of information: physical information and logical information. The physical channel line-up information includes parameters which effect the properties of the channels of the cable provider. The logical channel line-up information includes the parameters which characterize the channels in the marketplace, such as channel identification and logos. Such logical information may be modified without affecting the physical information, and so may be changed as necessary.

The master scheduler 20 may optionally perform the following channel line-up/configuration tasks: creation of new video channel entries, deletion of video channel entries, loading of initial channel configurations, modification of channel configurations, version control of channel line-ups, and the viewing and reporting of channel line-ups. As described herein the head-end configuration information may be stored using the data management system 70, and may be viewed and modified using the administrator interface 78 with the GUI 92. In addition, the report generator 74 may be used to generate the reports 96 of the information regarding the head-end configuration.

The master scheduler 20 also validates the configuration of the head-end 12 and the channels by examining the correctness of the parameter values, checking for exclusiveness of predetermined parameters which require unique values, checking physical bound-related parameters such as the bandwidth of each and all of the channels, and checking other configurable predefined bounds such as STB channel numbers. Inconsistencies in the configuration information may indicate incorrect scheduling.

For example, the actual duration data from the video server 11 may be different than the duration indicated for the asset by the schedule provider 84 within a predetermined tolerance of duration discrepancy. The duration indicated for the asset by the schedule provider 84 is obtained from the asset provider, for example "AMERICAST," while the video server 11 determines the actual duration data itself. Accordingly, the duration of any particular event is to be identical in each of the files containing such records of the particular event.

Other consistency checks include confirmation that the start and end times of a particular event have a duration equal to a predetermined duration of the particular event. In addition, content is not to be scheduled for play on the NVOD system 10 after a tape return date, and so such post-return scheduling indicates incorrect scheduling data received from the asset provider, for example "AMERICAST."

The master scheduler 20 may also have a dedicated NVOD channel set aside as a test channel and so to be unused for broadcasting NVOD programs. The test channel may be used for validating that the correct content is loaded and may be played out of the video server 11 and decoded on an STB, for example, subsequent to the loading of the content and before a scheduled viewing time. The test channel may also be used for monitoring video quality. The head-end configuration thus has the test channel marked or otherwise indicated such that the test channel, and only the test channel, is used solely for testing purposes, and such that the test channel is not distributed or reported to the EPG and the schedule data provider. The test channel may also be encrypted.

In order to program schedules and to set-up the head-end configurations accordingly, the master scheduler 20 generates multiple future versions of channel line-ups. The master scheduler 20 also tracks past, current, and future versions of the channel line-ups using, for example, the version field in the line-up elements 130. A new version may be marked as being a work-in-progress (WIP) before being marked as finalized, with only finalized channel line-ups being distributed.

Schedule Management

The schedule provider 84 shown in FIG. 2 may obtain scheduling data from an asset provider, for example the "AMERICAST" system, and, by virtue of being functionally connected to the master scheduler 20, transmit this scheduling data to the master scheduler 20. For example, the schedule provider 84 may be connected to the scheduler management system 62 to provide a new and/or updated schedule in a data format representing content and/or event schedules to the schedule management system 62 of the master scheduler 20. The data from the schedule provider 84 may include an electronic program guide (EPG) data file having scheduling information, a product definition file which provides pricing information of available programs and events, and an asset metadata file which provides information on the content and the tapes carrying the content.

For example, the schedule file may be provided in an EPG data file having the format shown in FIG. 8, in which a header record is associated with at least one service (channel) record corresponding to a specific service or channel. Each service record is in turn associated with at least one program record having corresponding event records.

Figure 9:
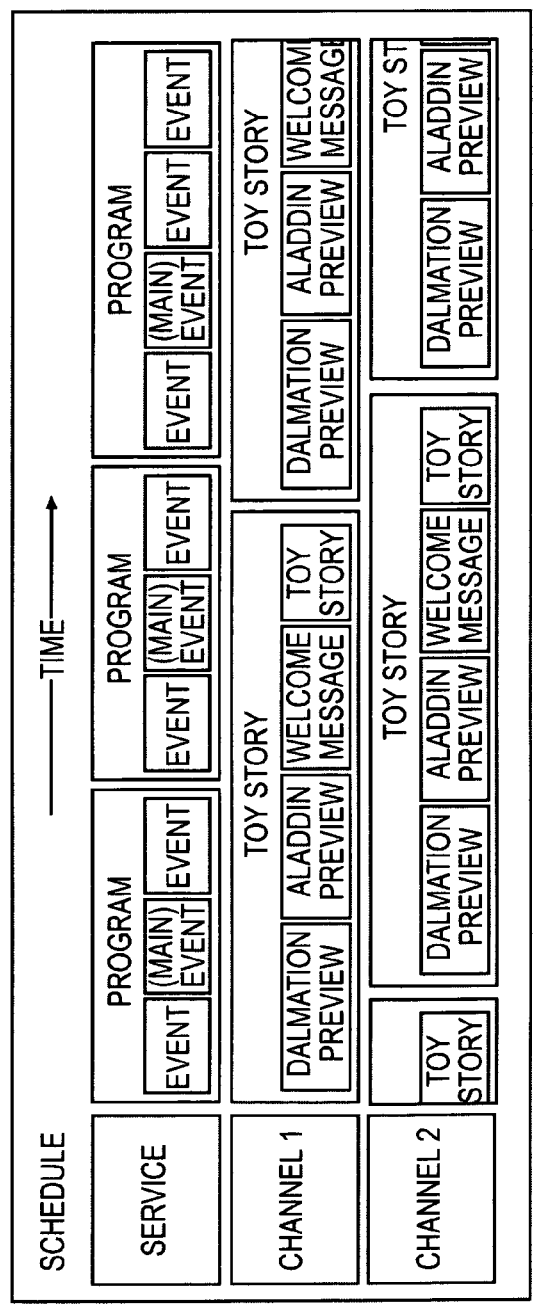
FIG. 9 illustrates an example of a schedule for NVOD services.

The schedule management system 62 then converts the schedule from the original data format to a new data format which is used internally by the master scheduler 20. For example, the schedule format shown in FIG. 9 may be used as the new data format to have each program with corresponding events serially grouped for each service/channel, with multiple channels having staggered start times for implementing the NVOD system 10. As shown in FIG. 9, each program may include a number of events, with at least one being a main feature, and other events being previews and interstices, for example, with NVOD system announcements of start times of events and main features.

The converted schedule is then processed by the schedule management system 62 with respect to the head-end configuration and previous schedule to validate that the new and/or updated schedule is to be used by the master scheduler 20. For example, the validation process may compare the new and/or updated schedule with the previous schedule to ensure that there are no conflicts; that is, no two events are scheduled at the same time or on the same channel. The schedule management system 62 may be configured to give the new and/or updated schedule precedence over the previous schedule; for example, to cancel a previously scheduled video program to broadcast a new video program.

In addition, the integrity and correct format of the received schedule in the first format may be checked by the schedule management system 62 prior to accepting the received schedule. The consistency of the channel line-up of the received schedule is also checked to meet predetermined channel line-up specifications. Also, the assignment of events to channels according to the number of channels and an associated bandwidth may also be checked, and the scheduling of events to have a proper time allotment may be verified.

In addition, the schedule management system 62 may determine whether sufficient time is available for a schedule to be processed, distributed, and implemented in the NVOD system 10. The schedule management system 62 may also determine whether interstitial information such as event and program announcements as well as premieres may be placed between the events and programs.

Upon completion of the validation process, the master scheduler 20 stores the new and/or updated schedule in the database 82 as a currently valid schedule. The master scheduler 20 then disseminates at least a portion of the currently valid schedule to external recipient systems, such as the video server 11, the electronic program guide (EPG) system 87, the factoid provider system 86, and the BSS 88, which are functionally connected to, for example, the schedule distributor 64 of the master scheduler 20, as shown in FIG. 2. For example, the schedule may be sent in an FTP format via a socket protocol to a playlist application of the head-end 12.

The electronic program guide (EPG) system 87 provides a guide for viewers. Data provided to the EPG system 87 by master scheduler 20 may be stored in an EPG data file having one or more service (channel) records, each having one or more program records, with each program record having one or more event records. The service records store information relating to a particular channel. The program records store information relating to a particular program, and the event records store information relating to events within a program, for example, portions to be shown as a preview of the program.

The business support system (BSS) 88 includes a billing system 26 and is provided with information from master scheduler 20 that relates to business transactions involving the NVOD system. For example, the master scheduler 20 may pass information relating to the prices of scheduled events to BSS 88. The price information is used by the billing system 26 to bill customers for the scheduled events.

In the distribution of the current valid schedule, the video server 11 may receive the downstream VCI and VPI information, while the factoid provider system 86 may receive, for example, only the titles of the videos available, and the BSS 88 may receive, for example, only the prices of the events.

In an example, the factoid provider system 86 may optionally be the commercially available system, and the BSS 88 may be the "INTELICABLE SYSTEM" (ITC), which is commercially available from "CABLEDATA".

FIG. 10 illustrates a GUI screen 174 for managing blocks of portions of schedules, in which a schedule specified by a name, time period, and/or version number is displayed for a plurality of channels labeled, for example, NVOD1, NVOD2, and NVOD3. The user may scroll through the plurality of channels and through the dates and months of a specified schedule. The status of the schedule as being active or inactive may also be indicated.

FIG. 11 illustrates a GUI screen 176 for managing programs within schedules, in which the start and stop times may be modified for specific programs for each channel. The user may scroll through the plurality of channels and through the dates and times of a specified schedule. Accordingly, schedules may be generated for selected time periods and selected services. Program-by-program and event-by-event schedules may thus be manipulated. For example, program block schedules may be generated as an aggregated schedule of a specific program within one service/channel or across multiple services.

The schedules may also be modified for selected attributes, such as version number and status; that is, active or WIP. In addition, selected attributes of each program and event may be specified, such as provider, source studio, MPAA rating, content ratings, etc. The program block schedule allows a user to obtain an overview of the movies and programming events offered on specific channels, with the duration of each event, for example, in terms of the number of days that the programs and events are scheduled to play.

FIG. 12 illustrates a GUI screen 178 for managing price changes of scheduled events, in which the current price of a program or event may be changed and updated. The scheduled run-times of the program/event as well as a scrollable list of a price history of the program/event may be displayed. Accordingly, flexible price editing of the schedule and specified programs/events therein may be performed.

Using the GUI screen 178, an administrator may specify, through additional commands in pull-down menus, default prices to be applied to an entire schedule, as well as price changes for individual programs, for programming blocks, and for different dates/times. The price changes may also be effected for programs with specified traits, such as title, provider, studio, MPAA ratings, etc.

FIG. 13 illustrates a GUI screen 180 for managing the status and distribution of schedules, which allows a user to scroll through and view the status and version numbers of schedules for a plurality of months.

Through the GUI screen 180, the date of distribution and confirmation of such schedules to a plurality of organizations and entities may also be viewed, and remarks may be entered and stored pertaining to such schedule status.

The user may also distribute schedules by actuating a BEGIN DISTRIBUTION icon, which causes the schedule distributor 64 to distribute all finalized schedules to available receiving entities, such as the factoid provider system 86, the BSS 88, and the video server 11, for distributing the prepared and finalized schedules to the appropriate receiving entities at the appropriate time. Once the schedules are distributed, the NVOD 10 is prepared such that the subscribers 36 are able to browse, select, and purchase available programs and events through their STBs.

Figure 14:
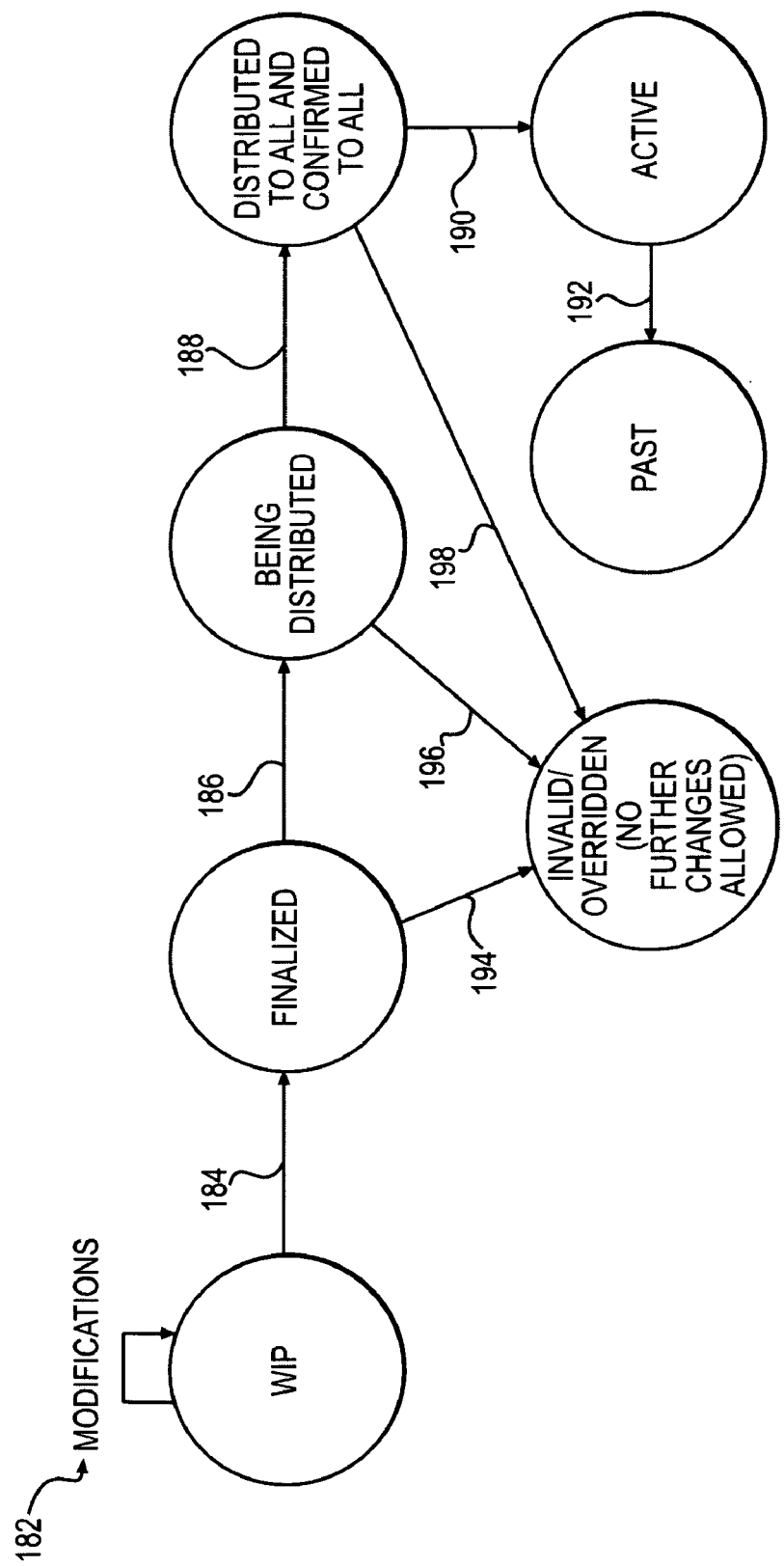
FIG. 14 illustrates a set of task states for distributing a channel line-up.

FIG. 14 illustrates a set of task states for distributing a channel line-up. After an initial WIP schedule is modified in step 182, and all modifications are completed in step 184, the WIP schedule is finalized to be a current version, which is then distributed in step 186 by the schedule distributor 64, with the schedule entering a BEING DISTRIBUTED state. The master scheduler 20 then waits for confirmation, electronic or otherwise, from the distribution receivers. Upon receiving confirmation from each of the distribution receivers, the master scheduler 20 causes the schedule to be in a fully confirmed state in step 188. In response to such a fully confirmed state, the schedule then enters an active state in step 190, in which the finalized channel line-up becomes effective.

The master scheduler 20 then monitors the dates and times for each finalized schedule. When a specific effective date/time passes, the master scheduler 20 causes the corresponding channel line-up to enter a PAST state; that is, a state of no longer being effective in step 192.

As more up-to-date channel line-ups are generated to be subsequent versions, the subsequent versions are finalized and distributed to override the current version. Accordingly, when a subsequent version is finalized in step 184, the current version of the channel line-up is concurrently invalidated or overridden in step 194. The finalized state of the current version is thus changed to be an invalid/overridden state. Similarly, as the subsequent version is distributed in step 186, the distribution status of the current version is changed in step 196 to be in an invalid/overridden state. Finally, as the subsequent version is confirmed by all distribution receivers, the confirmation status of the current version is changed in step 198 to be in an invalid/overridden state.

Figure 15:
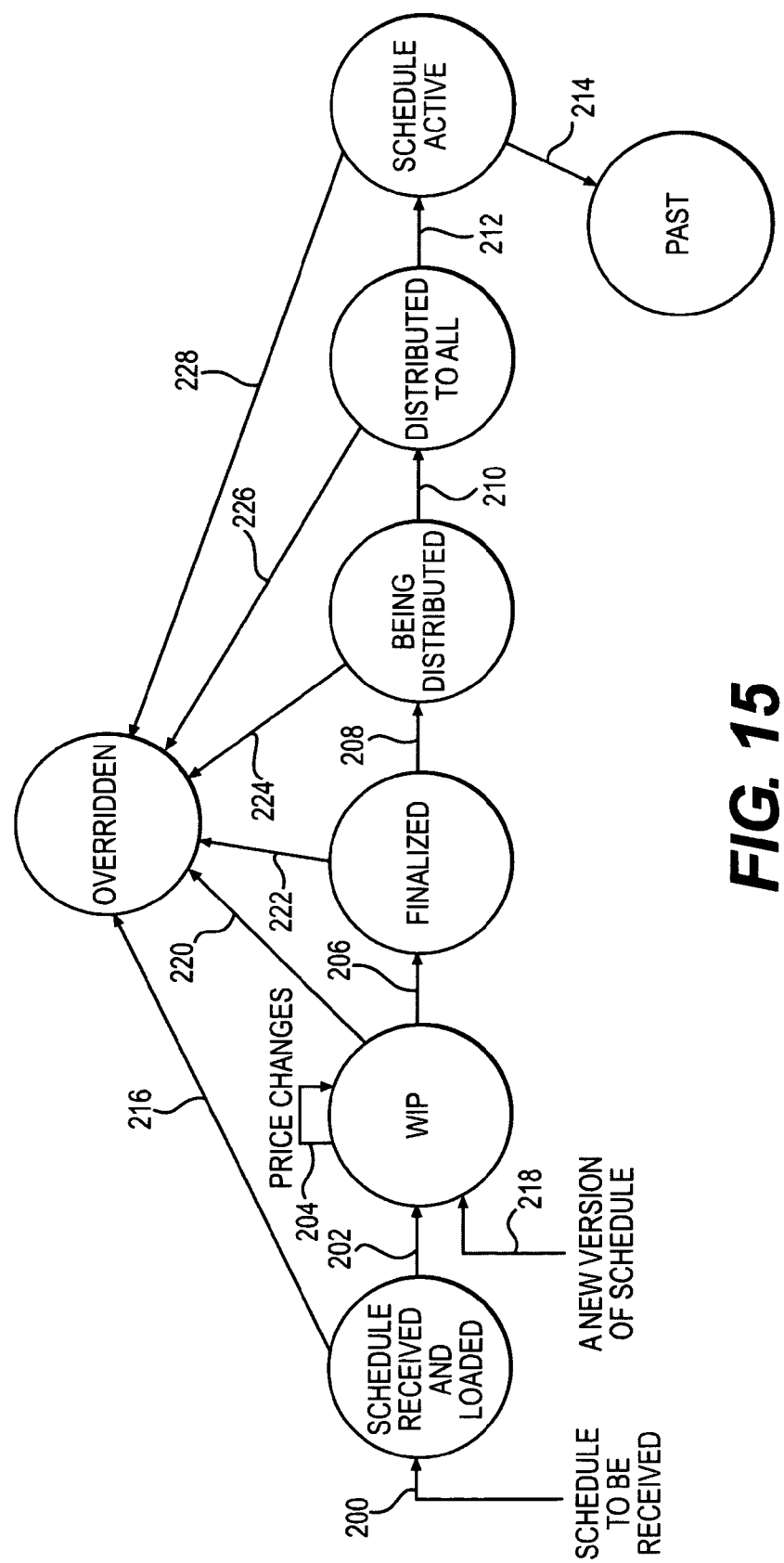
FIG. 15 illustrates a set of task states for distributing a periodic schedule of programs and events.

FIG. 15 illustrates a set of task states for distributing a periodic schedule of programs and events; for example, daily, weekly, or monthly, etc. For example, for monthly schedules, after an initial monthly schedule of programs/events is received in step 200 from a schedule data provider 84, the schedule is received and loaded. The schedule is then validated and, if valid, accepted in step 202 to become an initial schedule which is in a WIP state. After any price changes are effected in step 204, the WIP schedule is modified until all modifications are completed in step 206. The WIP schedule is thus finalized to be a current version, which is then distributed by the schedule distributor 64 in step 208, with the schedule being in a BEING DISTRIBUTED state. The master scheduler 20 then waits for confirmation from the distribution receivers. Upon receiving confirmation from each of the distribution receivers, the master scheduler 20 causes the schedule to be in a fully confirmed state in step 210. In response to such a fully confirmed state, the schedule then enters an active state in step 212, in which the finalized monthly schedule becomes effective.

The master scheduler 20 then monitors the dates and times for each finalized schedule. When a specific effective date/time passes, the master scheduler 20 causes the corresponding periodic schedule, such as daily or monthly, to enter a PAST state; that is, a state of no longer being effective in step 214.

As subsequent periodic schedules are received and then validated in step 202, a currently validated periodic schedule is overridden in step 216. Similarly, as a current WIP is modified, for example, to include subsequent versions in step 218 and/or to include the price changes in step 204, the current WIP is overridden in step 220. Furthermore, as subsequent versions are finalized and distributed in step 206, the current finalized version of the monthly schedule is concurrently overridden in step 222. The finalized state of the current version is thus changed to be an invalid/overridden state. Similarly, as the subsequent version is distributed in step 208, the distribution status of the current version is changed in step 224 to be in an invalid/overridden state.

When the subsequent version of the monthly schedule is confirmed in step 210, the currently confirmed monthly schedule is overridden in step 226. Further, as the subsequent version becomes the active monthly schedule in step 212, the active status of the current version is changed in step 228 to be in an invalid/overridden state.

The master scheduler 20 stores in the database 82 a predetermined and reconfigurable value indicating a minimum time window for determining a next schedule due date; that is, the date and/or time when a distribution is to commence. Such time windowing may be controlled by a schedule retrieval subsystem and/or the event notification generator 80 of the master scheduler 20, such that the schedule is properly applied to components throughout the NVOD system 10, and that the schedule is properly validated in adequate time before the scheduled programs/events are to be broadcast by the NVOD system 10.

The master scheduler 20 may periodically interact with the schedule provider 84, which serves as a content provider, to receive an updated schedule, such as new schedules and schedule changes. For example, the master scheduler may poll the schedule provider 84 for the updated schedule.

If a due date for distribution has passed without a distribution, for example, due to a lack in receiving an up-to-date schedule from the schedule provider 84, the schedule distributor 64 generates an alert which is sent to an administrator through the GUI 92. In one configuration, the schedule distributor 64 does not perform the distribution process unless the administrator manually initiates distribution, for example, relying on a previous monthly schedule of programs/events. In another configuration, the schedule distributor 64 may be set, by default, to use the monthly schedule from the previous month.

Asset Management

The asset management system 66 manages the video assets, such as asset tapes, which are received from the assets and tapes data provider 100 (FIG. 2). It is to be understood that other forms of assets may be employed, including video disks, digital video disks and/or digital versatile disks (DVDs), film spools, etc. The asset management system 66 performs archival and retrieval functions to store and obtain video data in the database 82. The asset management system 66 also tracks the status of the video data; for example, when and how often a video asset is retrieved.

Figure 16:
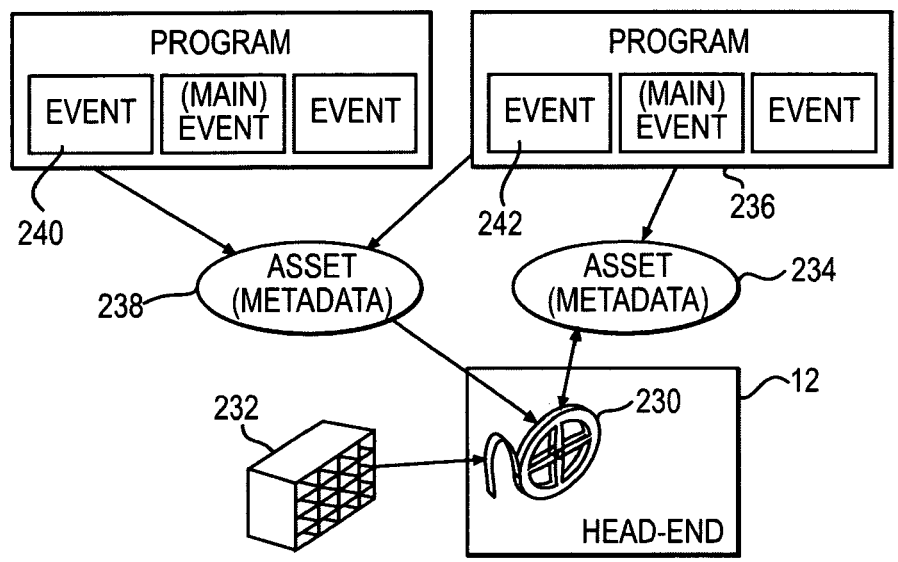
FIG. 16 illustrates a relational arrangement between scheduled programs, events, asset data, and asset tapes.

FIG. 16 illustrates a relational arrangement between scheduled programs, events, asset data, and asset tapes. An asset provider, such as "AMERICAST" or "DISNEY TELEVENTURES," periodically sends asset tapes 230 from an asset storage location 232 to the head-end 12 and thence to the video server 11 of the NVOD system 10. Alternatively, the asset tapes 230 may be provided directly to the video server 11. The head-end 12 and/or video server 11 subsequently provides the content from the asset tapes 230 to the subscribers 36, for example, using staggered broadcast times.

However, prior to such distribution to the subscribers 36, the asset tapes 230 are cataloged by the master scheduler 20. In addition, prior to return of the asset tapes 230 to the asset storage location 232, the cataloging of the asset tapes 230 by the master scheduler 20 is updated, for example, to indicate return of the asset tapes 230 and/or deletion of the entry for the returned asset tapes 230. Accordingly, asset management system 66 maintains asset data and metadata 94, which may be stored, for example, in the database 82.

As shown in FIG. 16, first asset metadata 234 may be maintained for a first event such as a main event 236, and second asset metadata 238 may be maintained for a second event, which may be a plurality of identical events 240, 242.

Figure 17:
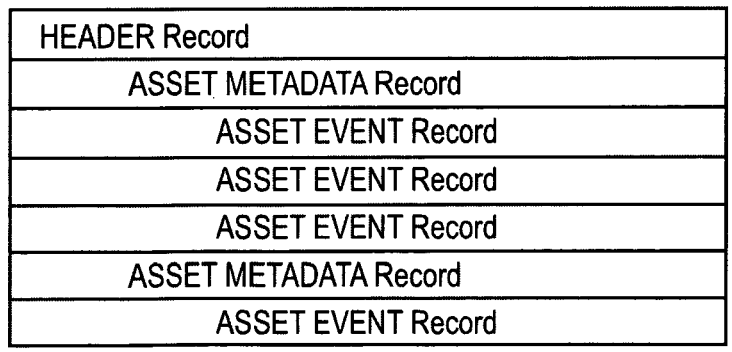
FIG. 17 illustrates an asset metadata file structure.

FIG. 17 illustrates an asset metadata file structure for the asset metadata 234, 238 of FIG. 16, with a header record being associated with at least one asset metadata record. Each asset metadata record is in turn associated with at least one asset event record. The asset event records may include indicators specifying that the event corresponds to a main event.

Figure 18:
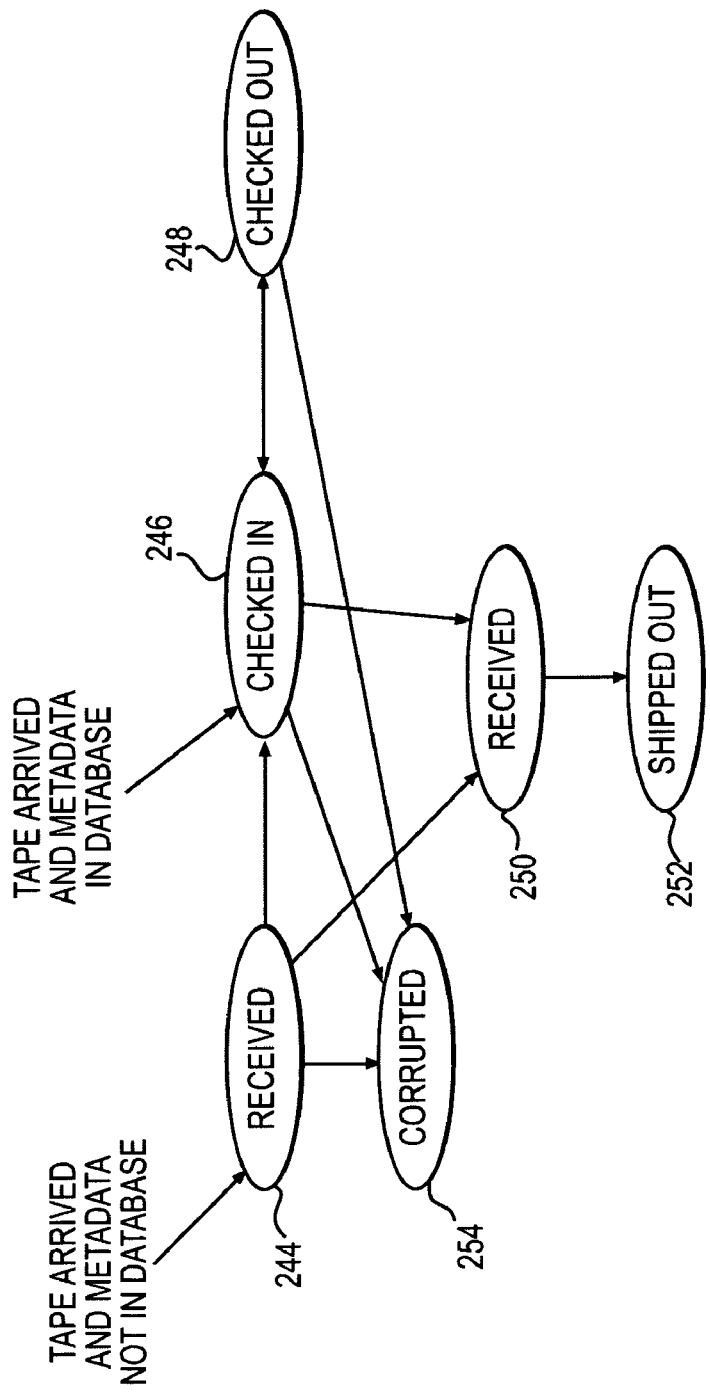
FIG. 18 illustrates a state diagram of the distribution of assets.

FIG. 18 illustrates a state diagram of the distribution of assets. When an asset tape arrives at the head-end 12, if no metadata associated with the asset tape is in a database of asset metadata, for example, stored in the database 82, the asset tape is received in step 244 to have such asset metadata generated and/or entered into the database. The asset tape is then checked in through the asset management system 66; that is, the asset tape is indicated in step 246 to be available to the video server 11 for distribution to subscribers 36.

Alternatively, if the asset tape arrives and associated metadata is present in the database; for example, if the asset tape had been previously used by the NVOD system 10, then the asset tape is directly checked in through the asset management system 66 in step 246.

Once the asset tape is checked in, the asset tape may be checked out in step 248, for example, to load the asset tape onto or into the video server 11 for distribution to subscribers 36 according to the finalized schedules.

During steps 244–246, it may be determined that a specific asset tape is instead to be returned to the asset storage location 232; for example, if there is no need for the specific asset tape in the foreseeable schedules of the NVOD system 10. Accordingly, the asset tape is received by the asset management system 66 in step 250 in order to have the asset metadata of the asset tape updated to indicate that the asset tape is being returned. The asset tape is then shipped out to the asset storage location 232 in step 252.

During steps 244–248, the integrity of the asset tape may be checked prior to processing. The asset tape may be determined to be corrupted; that is, physically damaged, informationally damaged including magnetically erased, or unidentifiable in the course of attempting to generate or process the metadata thereof. If the asset tape is corrupted, then the asset tape is recorded in memory in step 254 as having a corrupted state, and then the asset tape is returned to the asset storage location after steps 250–252 are performed to indicate the return of the asset tape and to ship out the asset tape.

Accordingly, an asset may be tracked and managed over the entire life cycle of the asset in relation to the master scheduler 20 and the NVOD system 10. The assets and the contents thereof may thus be cataloged and tracked as to the status of the assets. Such asset metadata by cataloging and tracking may be reported using the report generator 74 to generate reports 96 on the use of assets and the functioning of the NVOD system 10.

FIG. 19 illustrates a GUI screen for asset management, in which the asset data and metadata may be viewed and edited. For example, a plurality of assets, such as asset tapes, may be viewed with a listing of corresponding barcodes, tape names, locations, status as received and/or corrupt, and the current status such as being scheduled to be loaded. Individual tape details may also be viewed to list the barcode, tape name, and location of a selected tape. Comments may also be entered, stored, and subsequently viewed concerning a specific tape.

A plurality of icons may be provided to allow a user to receive a tape, check the tape in, check the tape out, return a tape, mark that the tape was corrupt, and other functions for reviewing and processing the asset metadata.

As shown in FIG. 19, the user may select and browse through a plurality of records in a plurality of modes such as view mode and edit mode. Other functions may also be supported, such as printing the records, and saving and/or deleting records.

FIG. 20 illustrates a GUI screen for accessing asset metadata, in which greater details may be retrieved from memory and reviewed. For example, the name of the asset and the source and provider IDs may be indicated. The shipping, loading, and return dates and times may be indicated, as well as the data size of the asset metadata. In addition, the user may input and thence retrieve additional information such as return instructions for properly returning the asset tape, and other instructions such as instructions common to different tapes, for example, to specify that a set of tapes are to be returned together.

The asset management system 66 processes the asset metadata to check such information against the schedule information. For example, an asset may be received which is scheduled for broadcast, so the processing of the asset and the asset data/metadata thereof may be given priority in processing. In addition, the duration of an actual asset may be compared to the scheduled duration of the asset in the asset metadata file. For example, actual asset may be loaded into video server 11. By measuring the amount of storage space needed on video server 11 to store the actual asset, given a known rate at which the data comprising the asset will be played, the duration of the actual asset can be determined. Significant discrepancies may cause the asset management system 66 to generate an alert and/or to reconcile the discrepancy, for example, by determining if the asset metadata of a specific asset tape is in error. The return date of the asset may also be checked against the schedule, for example, to ensure that the asset is returned after any scheduled broadcast, and not before a broadcast.

By utilizing barcoding methods with asset tapes, the physical tape entity may be correlated to the associated asset data/metadata. In addition, a location code may be assigned to the physical asset tape, with a location label having the location code emplaced on the physical asset tape. The location code may indicate a designated location for storing the asset tape in the NVOD system 10 prior to return to the asset storage location 232.

The asset management system 66 may also generate alerts through, for example, the event notification generator 80 to provide warning messages in the event that a user is attempting to check out an asset tape which is currently loaded in the video server 11 and/or which is scheduled to be loaded on the video server 11, unless the asset metadata of the specific asset tape indicates that the asset tape is in a corrupted state.

Video Server Content Management

The video server content manager 68 communicates with the video server 11 to inquire about content-related information. For example, the video server content manager 68 determines when and where to load/unload an item of content, such as a video asset. The video server content manager 68 also performs an operations procedure 102 to allow administrators to monitor and control the loading and unloading of content, and validates the content loading and unloading of the content.

Figure 21:
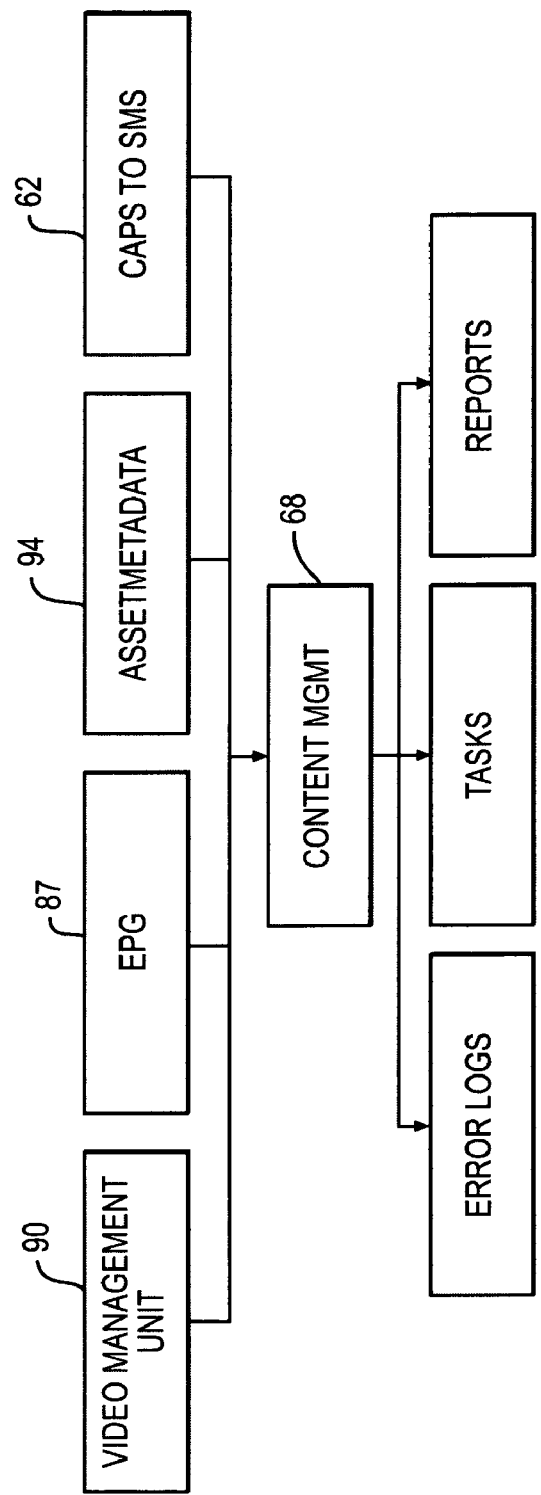
FIG. 21 illustrates data paths of content for content management in the disclosed master scheduler.

FIG. 21 illustrates data paths of content for content management in the disclosed master scheduler 20. The video server content manager 68 receives information from the video management unit 90, such as an HP VTE terminal, as well as from the schedule provider 84. The video management unit 90 sends HP VTE information, such as content information and data provider disk space utilization, to the video server content manager 68. The content information may include content title, content size, bit rate, and duration of the content.

The schedule provider 84 sends EPG schedule fields 87 such as service records, program records, and event records in a format such as shown in FIG. 8. In particular, the service records include a channel designation, the start and end dates/times, and the number of programs. The schedule provider 84 may also send content information, such as asset data and metadata from the "CAPS" system of "AMERICAST," to the schedule management system (SMS) 62 of the master scheduler 20, and thence to the video server content manager 68.

The asset metadata 94 may be provided from the asset management system 66, including an asset name, bit rate, size, duration, start date, end date, load date, return date, and assigned barcode.

Upon receiving such content information, the video server content manager 68 generates error logs, tasks, and reports, which may be processed through the event notification generator 80, the task management system 72, and the report generator 74 (FIG. 2), respectively.

Figure 22:
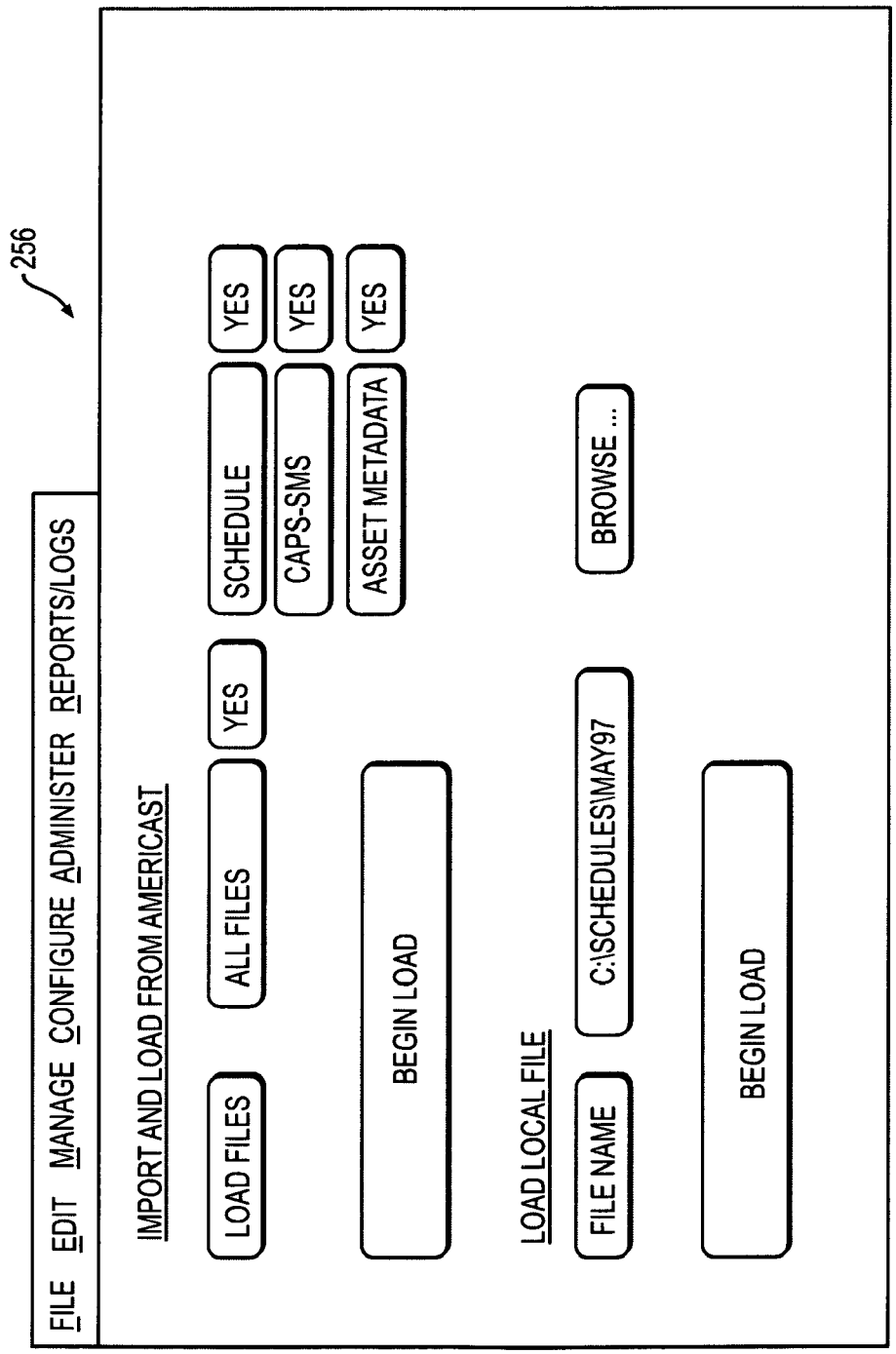
FIG. 22 illustrates a GUI screen for importing and loading files specifying schedules.

FIG. 22 illustrates a GUI screen 256 for importing and loading files specifying schedules through the video server content manager 68. From the screen 256, the administrator may load content to the video server 11 from a plurality of providers, such as imported/downloaded content such as assets and tapes 100 from an asset provider, such as "AMERICAST," as well as schedules, "CAPS-SMS" data, and asset metadata 94. In addition, the administrator may also load content presently stored in the database 82 of the master scheduler 20 as local files to the video server 11.

Figure 23:
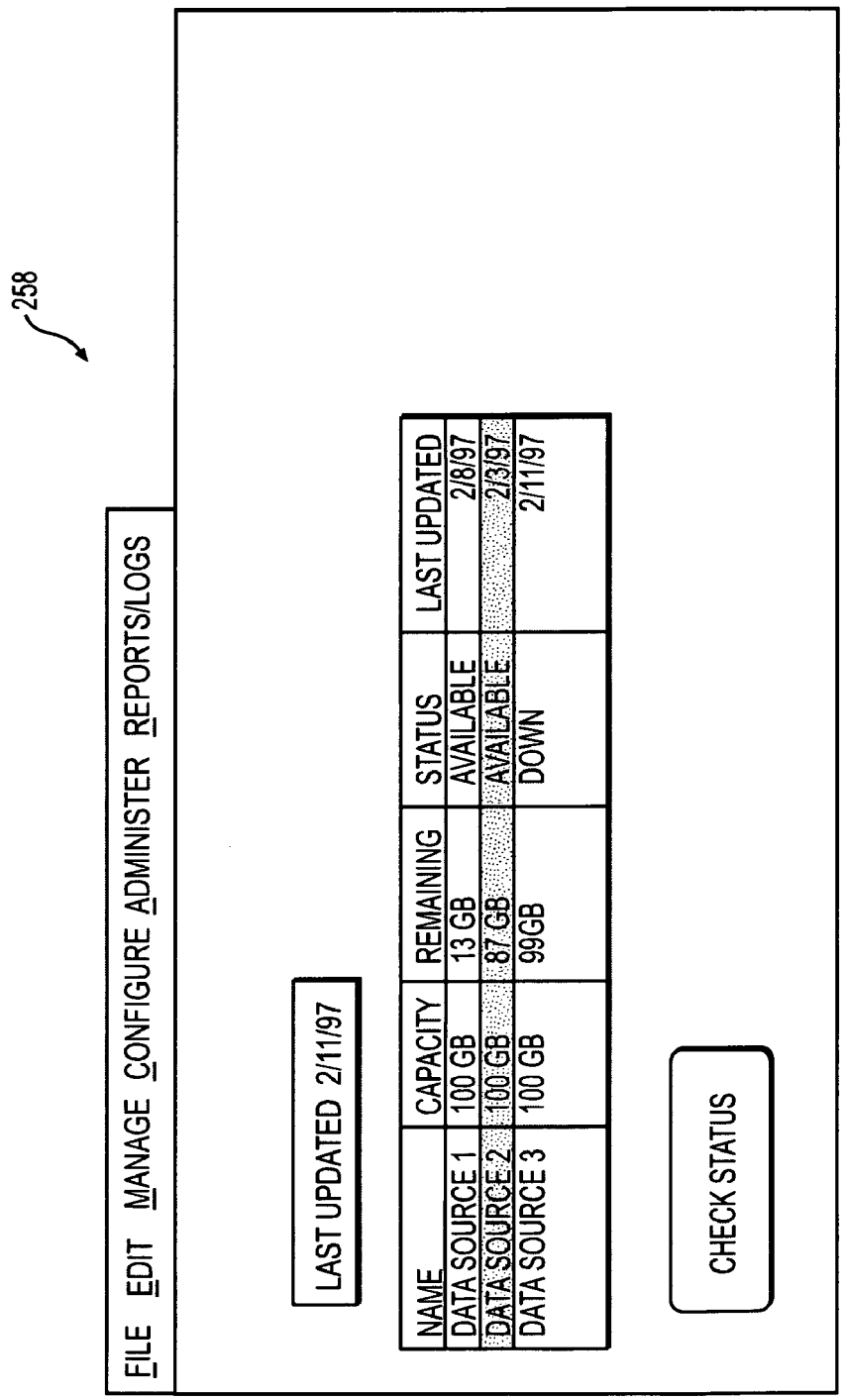
FIG. 23 illustrates a GUI screen for content management of data providers.

FIG. 23 illustrates a GUI screen 258 for content management of the video server's data sources, in which each data provider is identified by name or designation, by a respective total capacity, and by the remaining capacity for providing content. The status of each data provider as being available or down (unavailable) is also provided, and the last update of the status and capacity of each data provider may also be listed.

Figure 24:
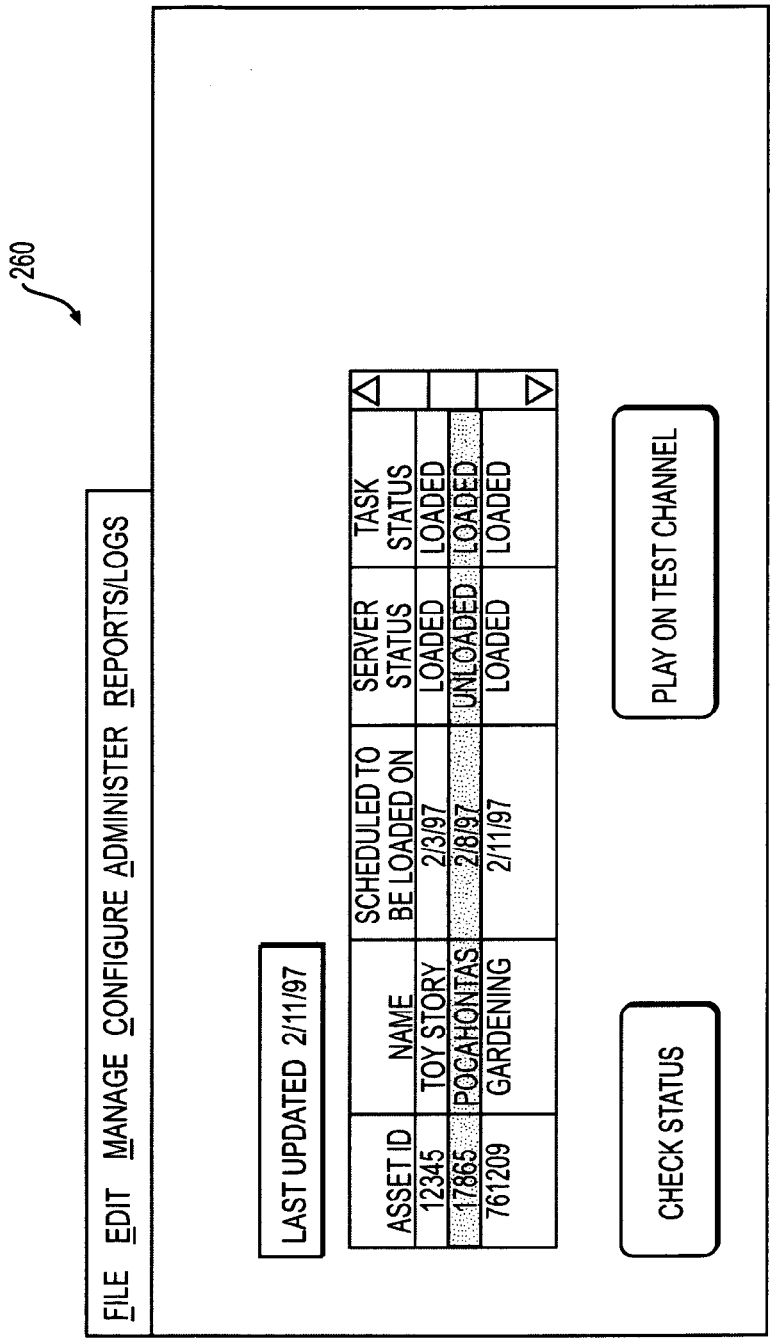
FIG. 24 illustrates a GUI screen for validating content management actions.

FIG. 24 illustrates a GUI screen 260 for validating content management actions. For example, each available asset may be listed by title and/or asset ID number. The scheduled loading date may be displayed, as well as the status of the loading to the video server 11. The status of a task may also be displayed, to indicate that a task is loaded or unloaded. If a task is loaded, the task is ready to be performed, i.e. to load the video server 11 with the corresponding asset. In addition, for validating a specific asset through the screen 260, the status of an asset may be checked by actuating a CHECK STATUS icon. The validation of the specific asset may also be performed by actuating the PLAY ON TEST CHANNEL icon to utilize the test channel to view the asset for verifying the integrity of the asset prior to distribution to subscribers 36.

Figure 25:
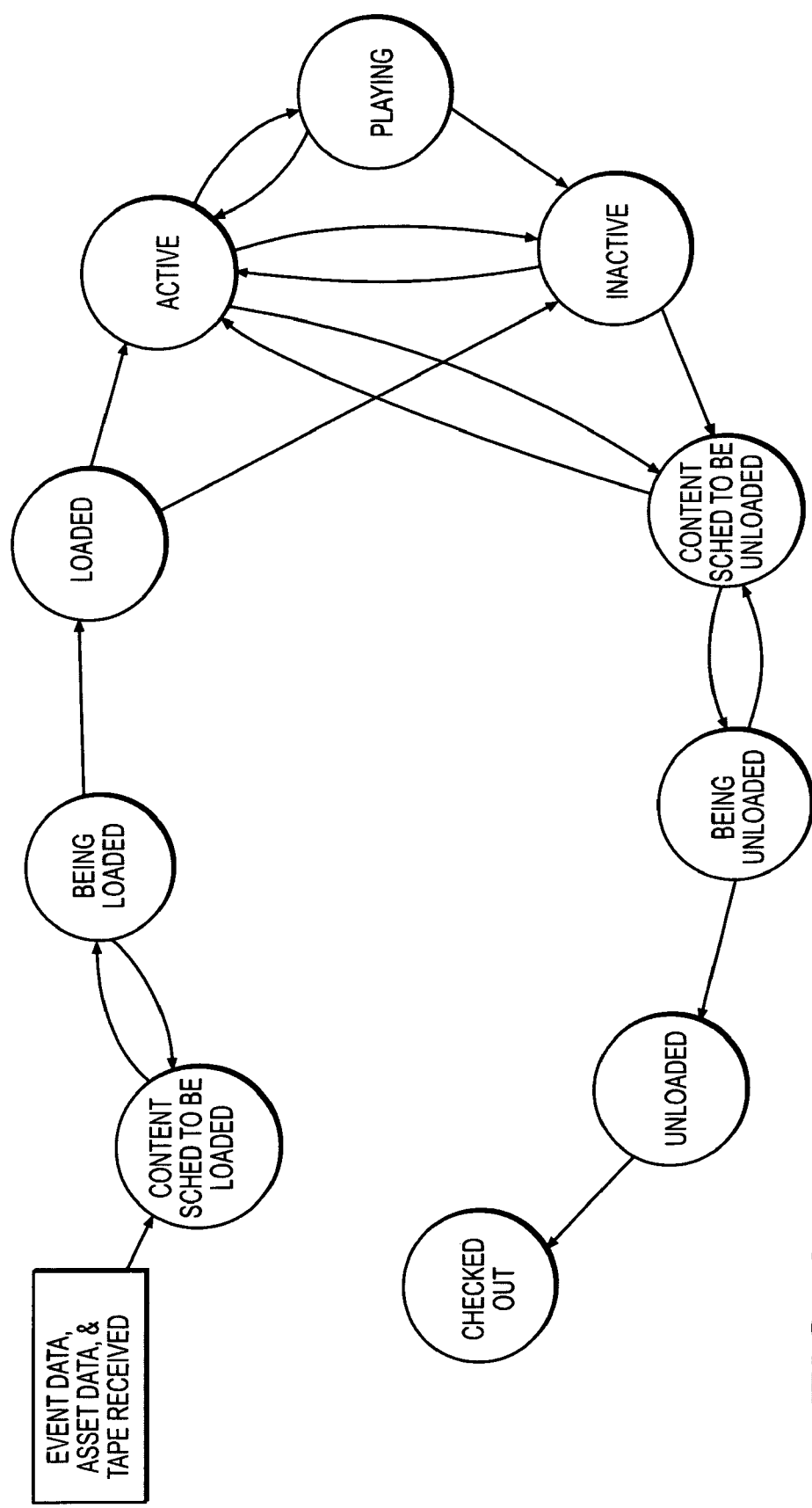
FIG. 25 illustrates a state diagram for loading and unloading content.

FIG. 25 illustrates a state diagram for loading and unloading content. Once the event data, asset data, and asset tape are received as content, the content is scheduled to be loaded according to the validated schedule determined by the schedule management system 62, described above. At appropriate loading times, the content is loaded into the video server 11. This loading step may be performed by transferring data to the video server, for example electronically, or by loading media, such as video tapes. The assets may span multiple tapes, and so the loading step may require multiple steps to fully load some video content such as movies into the video server 11.

The content is then in a loaded state in the video server 11. From the loaded state, any specific item of content may be in an active state or be in an inactive state; for example, the item of content may be loaded in advance of a scheduled start time, and so the item of content waits in an inactive state until used or unloaded, for example, in the event of a schedule change.

Once the item of content is active according to the schedule, the item of content may then be played by the video server 11; that is, the item of content is sent to the subscribers 36. Since the NVOD system 10 staggers content by predetermined time intervals, portions of an item of content may be active and not playing, while other portions are active and playing. However, once an item of content is no longer playing, the item of content may enter the active state or the inactive state.

According to the current schedule, either the item of content is to become active subsequently, or the item of content is scheduled to be unloaded from the video server 11. As indicated in FIG. 25, no inactive content is playable until the status of the content is changed to the active state.

In addition, an active item of content may be scheduled to be unloaded, according to the current schedule, immediately after play, and so the item of content need not enter an inactive state to be scheduled to be unloaded.

Once scheduled for unloading, the content is unloaded from the video server 11, which may require multiple passes to remove and/or erase predetermined amounts of the content. The content is then in an unloaded state, and the content is subsequently checked out as being unavailable by the asset management system 66.

The video server content manager 66 of the disclosed master scheduler 20 uses an intelligent processing method to determine when and where to load/unload content for each scheduled event. The video server content manager 68 operates using factors such as the configuration of video server data providers, the remaining space of the data providers, a load balance among the data providers, the content currently loaded into the video server 11, the scheduled working days, hours, and holidays of manual technicians such as the administrator, who would physically load tapes if necessary, an estimated time to load/unload content, the time to verify the content by looking at all or part of it, the content currently queued to be loaded/unloaded, a required quality assurance (QA) time, etc.

For example, the intelligent processing method of the video server content manager 68 may have general goals to maximize performance, such as functions to minimize the number of uses of any single data provider, in order to minimize any loss of programs and revenue if a data provider becomes available, including system maintenance or if the data provider goes down. Another goal may include minimizing the number of simultaneous uses of or demands upon any single data provider, and also adjusting load balances among a plurality of data providers. Pass-through procedures may be performed, such as the determination of main events loaded from each data providers, and then, for each unique main event, the current and future schedules are scanned to determine the current uses and the number of simultaneous uses of the data providers. In addition, for each data provider, the total current and future uses of main events are determined. For each new portion of a main event, a data provider is determined which has a minimum number of uses, such that if the determined data provider has enough memory space and stream slots, then the main event is placed from the data provider.

As the video server content manager 68 interacts with the video server 11, validation procedures are also performed to determine if appropriate assets are loaded; otherwise, an alert is generated upon the discovery that an incorrect asset is loaded/unloaded. In addition, the video server content manager 68 also polls the video server 11 at regular intervals to verify that a load content instruction was performed properly; otherwise, an alert is generated.

Data Management

The data management system 70 maintains the database 82 for storing information about the assets from content providers, as well as network configurations used to transport video data, such as MPEG-2 video bitstreams. The data management system 70 also stores the current valid schedule for delivering NVOD events to the subscribers 36. Other persistent data used by the master scheduler 20, such as the operating parameters and user login data such as passwords, as well as an operating system and application programs executed by the master scheduler 20, are stored in the database 82 and maintained by the data management system 70.

The database 82 may be a commercially available database 82 from "ORACLE" such as the "ORACLE" 7.3.X database, and so the data management system 70 may include an "ORACLE" interface using, for example, "SQL*NET".

Task Management

The task management system 72 coordinates and causes the execution of tasks and sub-tasks performed by the master scheduler 20, and also tracks the execution and status of such tasks and sub-tasks, in order to complete all tasks in an orderly and timely manner.

Figure 26:
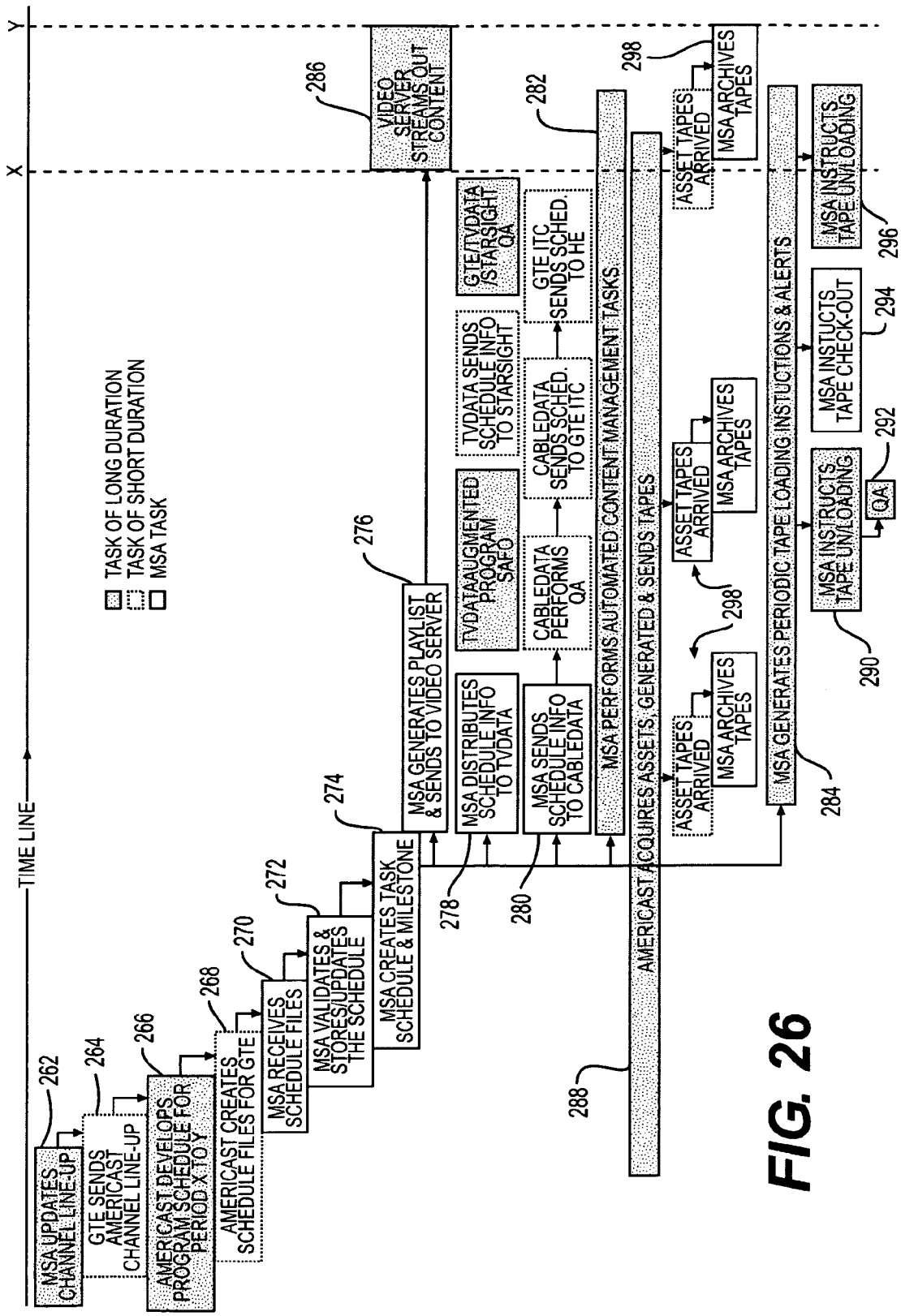
FIG. 26 illustrates a timeline and flow diagram of the performance of tasks.

FIG. 26 illustrates a timeline and flow diagram of the performance of tasks and task dependencies. The master scheduler 20, through the MSA, updates the channel line-up in step 262, and the NVOD system 10, such as a "GTE" NVOD apparatus, sends the channel line-up to the schedule provider 84 in step 264, which develops a program schedule in step 266 for a specific period beginning at time X and ending at time Y. The schedule provider 84 creates schedule files in step 268 for the NVOD system 10, and the MSA receives the schedule files therefrom in step 270.

The MSA then validates, stores, and updates the schedule in step 272, and the MSA then creates in step 274 a task schedule and milestones; that is, indicator events, times, and tasks which are used to gauge the operation of the master scheduler 20. The MSA proceeds to generate a playlist and send the playlist to the video server 11 in step 276; distributes the schedule information to the factoid provider system 86, such as "TVDATA", in step 278; sends the schedule information to the BSS 88, such as the "CABLEDATA INTELICABLE SYSTEM" (ITC) in step 280; performs automated content management tasks in step 282, as described above; and generates periodic tape loading instructions and alerts in step 284. The steps 276–284 are commenced at substantially the same time.

After step 276, the video server 11 receives the playlist from the MSA and streams out content in step 286 from start time X to end time Y to preform the NVOD services over the plurality of channels according to the schedules and playlist from the MSA.

After step 278, the factoid provider system 86 augments program information with the distributed schedule information, and sends schedule information to other facilities, such as "STARSIGHT". In addition, each of the NVOD system 10, the factoid provider system 86, and the other facilities perform quality assurance (QA) procedures for ensuring, for example, that the schedule information is consistent and in the correct format.

After step 280, the BSS 88, such as the "CABLEDATA ITC" system, performs a QA procedure on the received schedule information, and sends the schedule information to the ITC interface of the NVOD 10, which may be functionally connected to the schedule distributor 64 of the master scheduler 20. The NVOD 10, in turn, sends the schedule information to the head-end (HE) 12.

For any task schedule generated by the MSA in step 274, the step 282 of automated content management is performed over a relatively long duration, and also into a specific scheduled time window between times X and Y, in order for content to be processed and managed to send content to the video server 11 for operation during the scheduled time window.

In addition, step 288 is performed over a relatively long duration such that the acquisition of assets and the generation and transmission of tapes by the schedule provider 84 begins when the master scheduler 20 sends the channel line-up in step 264. The acquisition and transmission of tapes may also extend into the scheduled time window to provide the video server 11 with the scheduled assets and content.

Because tape loading instructions are generated in step 284, the master scheduler 20 instructs the video server 11 and/or the video server content manager 68 in step 290 to load and/or unload specific tapes, for example, to prepare for upcoming scheduled events. A QA procedure may then be performed in step 292 to ensure that the proper tapes have been loaded and/or unloaded, and especially in sufficient time before a scheduled event to remedy any loading/unloading errors.

The tape loading instructions from step 284 may also instruct the video server content manager 68 to check-out tapes in step 294, for example, if a schedule is modified to cause some tapes to be unnecessary and so returned to the asset storage location 232.

During the schedule window, the master scheduler 20 may continue in step 296 to instruct the video server 11 and/or the video server content manager 68 in step 290 to load and/or unload specific tapes, for example, to prepare for upcoming scheduled events during the schedule window, and to unload used tapes after the corresponding events have occurred.

In step 288, assets are repeatedly sent, and so in steps 298, the assets are repeatedly received at the NVOD 10 from the asset storage location 232, and the master scheduler 20 in turn archives the assets, for example, by checking tapes in, and holding onto the tapes until the assets thereupon are loaded onto the video server 11.

Figure 27:
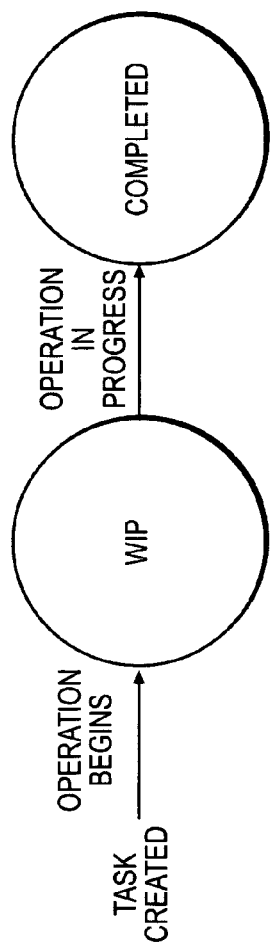
FIG. 27 illustrates a state diagram of task progress.

FIG. 27 illustrates a state diagram of task progress. After a task is created, the corresponding operation of the task begins and the task enters a WIP state. The operation is then in progress until completed, when the task enters a completed state.

Figure 28:
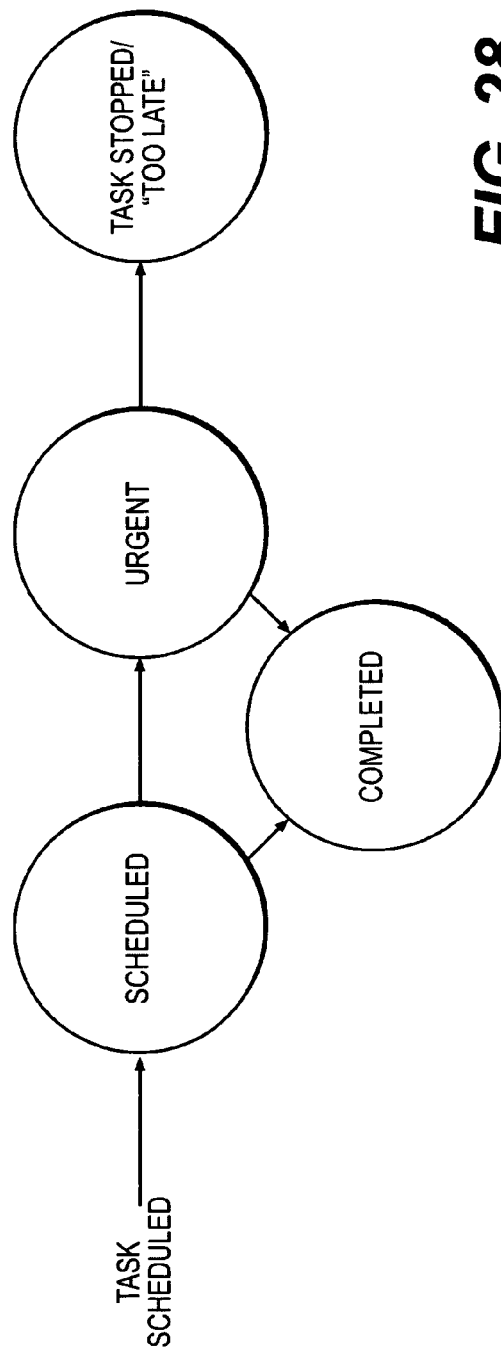
FIG. 28 illustrates a state diagram of a task timeline.

FIG. 28 illustrates a state diagram of a task timeline. After a task is scheduled for a specific early start date/time, the task enters a scheduled state. For example, the tasks may involve loading a specific tape for a specific scheduled event. As the task is performed, as shown in FIG. 27, the task management system 72 tracks the start dates and times as time passes. If the scheduled start date/time occurs and the task has been completed, the task enters a completed state.

Otherwise, if the start date/time passes, the task enters an urgent state. The task management system 72 then determines if the task has been completed and/or is a WIP. If completed, the task enters the completed state. If the task is not completed and is not a WIP, an alert is generated and sent to the event notification generator 80, and the task is stopped. The task then enters a stopped state, in which the task is too late to be completed.

Figure 29:
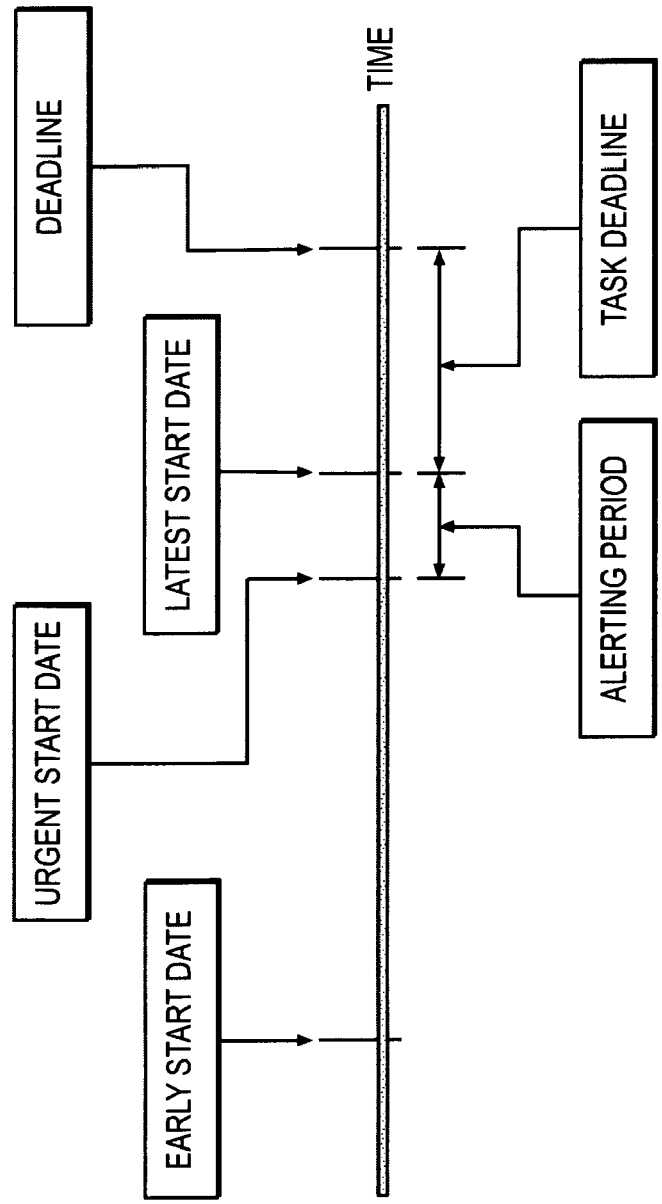
FIG. 29 illustrates a timeline for task tracking.

FIG. 29 illustrates a timeline for task tracking, in which the early start date, the urgent start date, the latest start date, and a deadline are set, and are maintained and stored in memory, such as the database 82. The master schedule 20 includes a clock device for monitoring and updating a stored value of the current date and time. At least the task management system 76 monitors the current date and time to determine whether such start dates and deadlines have occurred, and so to generate alerts.

During the alerting period between the urgent start date and the latest start date, alerts are generated to indicate that a task is to be initiated before the latest start date in order to allow the task to have sufficient time to be completed before the deadline. The latest start date is determined to provide at least a minimum time for the task duration, as well as optionally some tolerance time. The alerting period may be any arbitrary time period predetermined and set by an administrator.

Automated tasks are automatically performed, unless overridden by an administrator. Manual tasks are performed by an operator who is alerted by the event notification generator 80 in response to alert signals generated by the task management system 72.

In creating task instructions, as in step 274 of FIG. 26, the task management system 72 generates appropriate signals to the report generator 74 to have the task schedule and instructions reported weekly for work planning purposes, and reported daily for causing the performance of tasks for any given day. The task instructions are also used to track the progress of tasks according to the scheduled start and completion times of tasks, the actual start and completion times, any errors encountered, and the results of such tasks, and the task management system 72 generates corresponding task tracking data reflecting such task progress. The task management system 72 may forward the task tracking data to the report generator 74 to generate task progress reports.

Content management tasks are generated by the task management system 72 using parameters from the video server content manager 68. For example, the content management tasks are step-by-step instructions for instructing the video server 11 to load, unload, and relocate assets to and from tapes.

In generating such content management tasks, the task management system 72 provides for correct procedures, commands, and parameters to indicate which tapes to obtain, where each tape is located, which tapes to load for an upcoming schedule, which content to unload from the video server 11, and how to load and unload assets from designated providers and destinations, respectively. The task management system 72 may interrogate or poll the video server 11 at regular intervals, such as daily, to ensure that the tasks are performed properly and routinely.

The task management system 70 may also generate and manage tasks for asset management in conjunction with the asset management system 66, for example, to manage delivery and shipping of tapes from the asset storage location 232, including logging shipping slips as well as affidavits of delivery and return of tapes to and from the NVOD 10.

Report Production

The report generator 74 allows users, such as system administrators, to generate a variety of pre-defined reports 96. The report generator 74 may be hardware and/or software commercially available from "ORACLE", and is functionally connected to at least one output device, such as a printer, a display, a disk storage system, or a network on-line connection, to generate corresponding reports therefrom. The output device may be included in the master scheduler 20, or alternatively may be external to but functionally connected to the master scheduler 20.

For example, the reports 96 may be visually displayed through the GUI 92 by sending the reports 96 to the administrator interface 78. A user may then print the form from the screen by a screen capture procedure, which may involve blocking off a selected portion of the report on the screen to be printed.

The report generator 74 may prepare and issue the following types of reports: channel configuration/line-up report, asset and tape catalog report, server content report, task management report, event schedule, and trouble/error report.

The channel configuration/line-up report is generated in response to receiving a date to determine when the channels are in effect. The channels may be presented in tabular format, such as shown in FIG. 7, which lists the physical as well as logical configuration information for the NVOD channels originating from the video server 11 and ending at the STB of the subscribers 36. Reports of channel line-up changes, such as changes to the latest version of the line-up, may also be generated.

The asset and tape catalog report provides an inventory of all tapes and assets which are currently in the possession of the NVOD 10. The report generator 74 may include filtering and sorting functions to obtain, for example, lists of tapes to be returned, or lists of assets currently loaded in the video server 11.

The server content report summarizes the contents and assets on the video server 11 at any specified moment, and includes information such as metadata of the loaded content, location of the content, and whether the content is currently in use; that is, playing and being streamed out to subscribers 36. The server content report maybe be generated to be arranged according to content title, content status, and/or content location.

The task management report may be generated on a daily or weekly basis to list the tasks and instructions to be performed by the NVOD 10 and by the administrators using the master scheduler 20. The milestones and progress charts may be listed indicating milestones reached and/or progress for a specified day or week. For manual loading, unloading, and relocation of content, administrators may use a content management report regarding content management which is generated to provide detailed content management procedures which administrators are to follow, for example, through commands input via the video management unit 90 and/or the GUI 92. The content management report may be generated with or as a portion of the task management report.

The event schedule may be generated in a format such as shown in FIG. 9. The trouble/error report may list errors encountered and generated alerts in an error log, for example, in chronological order.

Security Management

The security management system 76 maintains security protocols to ensure that only legitimate users may gain access to the operations of the master scheduler 20. The security management system 76 also ensures that only authorized operations according to predetermined privileges may be performed via the master scheduler 20. A user database is maintained, for example, in the database 82, which lists user names and passwords of authorized users such as administrators of the master scheduler 20. Login and confirmation of passwords as well as re-login procedures may be performed. The re-login procedures may be performed if the master scheduler 20 times out; that is, if the master scheduler 20 is relatively inactive for a predetermined time period.

In addition to user management, access control is maintained with hierarchies of users having associated privileges, such as read-write privileges as opposed to read-only privileges. For example, read-write privileges may be assigned only to local users such as administrators, while remote users such as tape receiving personnel may be granted only read-only privileges.

Four security hierarchies may be provided, labeled MSA_VIEW (viewer), MSA_MKTG (marketer), MSA_OPER (operator), AND MSA-ADMN (administrator). A user with MSA_VIEW access has rights to view schedule-related data reports, prices, programs, schedule dates, pending tasks, etc. A user with MSA_MKTG access has the rights of an MSA_VIEW user as well as rights to edit/save prices and to finalize schedules. A user with MSA_OPER access has the rights of an MSA_MKTG user as well as rights to import and load files, to perform schedule processing and distribution, to perform diagnostics, and to manage assets and content. A user with MSA_ADMN access has the rights of an MSA_OPER user as well as rights to configure the head-end 12, to configure assets, and to perform securing management, as well as to access all functions of the master scheduler 20.

Administrator Interface Facilities

The administrator interface 78 allows an administrator to view schedules, to make price changes for the use of the NVOD system 10, to perform content management using the video server content management system 68, and to generate reports using the report generator 74. In addition, administrators may perform a predetermined shutdown procedure through the administrator interface 78 for properly shutting down the master scheduler 20 and/or the NVOD system 10. The administrator may also use the administrator interface 78 to export records and data from the database 82 and perform other system management tasks, as described herein.

The administrator interface 78 may include the graphic user interface (GUI) 92, such as a GUI interface based on "WINDOWS" such as "WINDOWS NT", available from MICROSOFT CORPORATION. Accordingly, administrators are provided an easy-to-use, interactive, and point-and-click facility to access the functions of the master scheduler 20 and the NVOD 10.

Figure 30:
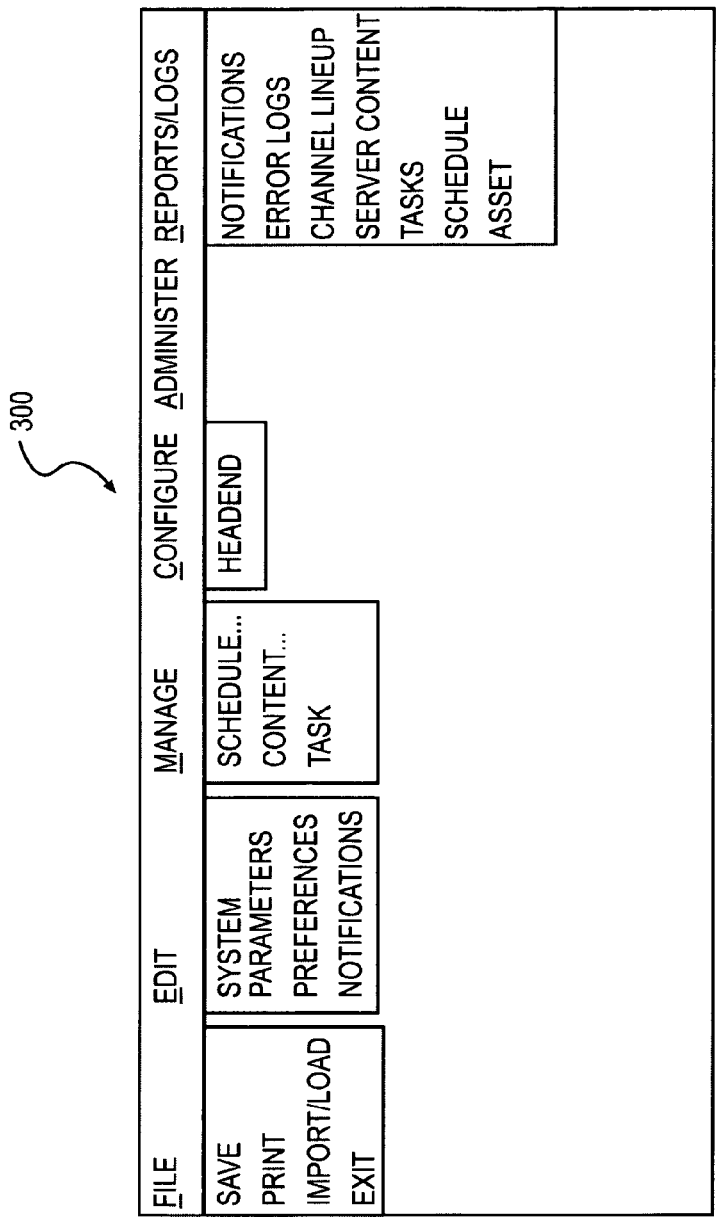
FIG. 30 illustrates a set of pull-down menus of a GUI screen of the master scheduler application.

FIG. 30 illustrates a set of pull-down menus of a GUI screen 300 of the master scheduler application, which allows an administrator, for example, to import/load content to the video server 11; to set and edit system parameters, preferences, and notifications, such as notifications generated by the event notification generator 80; to manage schedules, content, and tasks; to configure the head-end 12; and to generate and print reports/logs 96 through the report generator 74. Such reports 96 may include indications of notifications, error logs, channel lineup, server content, tasks, schedules, and assets.

As shown in FIGS. 30–35, the various display screens may be generated through the GUI 92 of the video management unit 90, which may be a terminal or workstation. Though point-and-click interaction, an administrator has access to the functionality of the master scheduler 20 to administer the NVOD 10.

Alternatively, the various display screens may be text and/or non-GUI oriented screen interfaces, such as choices displayed on a screen which may be selected by tabbing using a TAB key, or otherwise relying on specific keyboard commands such as hotkeys and key combinations.

FIG. 31 illustrates a GUI screen 302 for purging records, which may be an option available to the administrator through the ADMINISTER command on screen 300 of FIG. 30. Through the GUI screen 302, an administrator is able to select a range of dates for marking any programs, events, and tasks in such a range for deletion. The administrator may then delete the records by actuating the DELETE icon, and so to purge outdated records to clear memory in the video server 11 as well as to improve the efficiency of the master scheduler 20 to process all of the available records, since outdated records may be unnecessarily processed with up-to-date records.

FIG. 32 illustrates a GUI screen 304 for editing system parameters, such as the default price for pay-per-view events, a minimum distribution time of the finalized schedules to the factoid provider 86 and the BSS 88, a minimum loading time of content to the video server 11 in advance of a scheduled time for the content, and hardware configuration parameters such as the maximum number of VCIs, the maximum number of STB display channels, and the range of channel frequencies such as the maximum and minimum channel frequencies allotted to the NVOD channels. Such parameters may be scrollable and selectable through the "WINDOWS"-based GUI screen 304 shown in FIG. 32.

Figure 33:
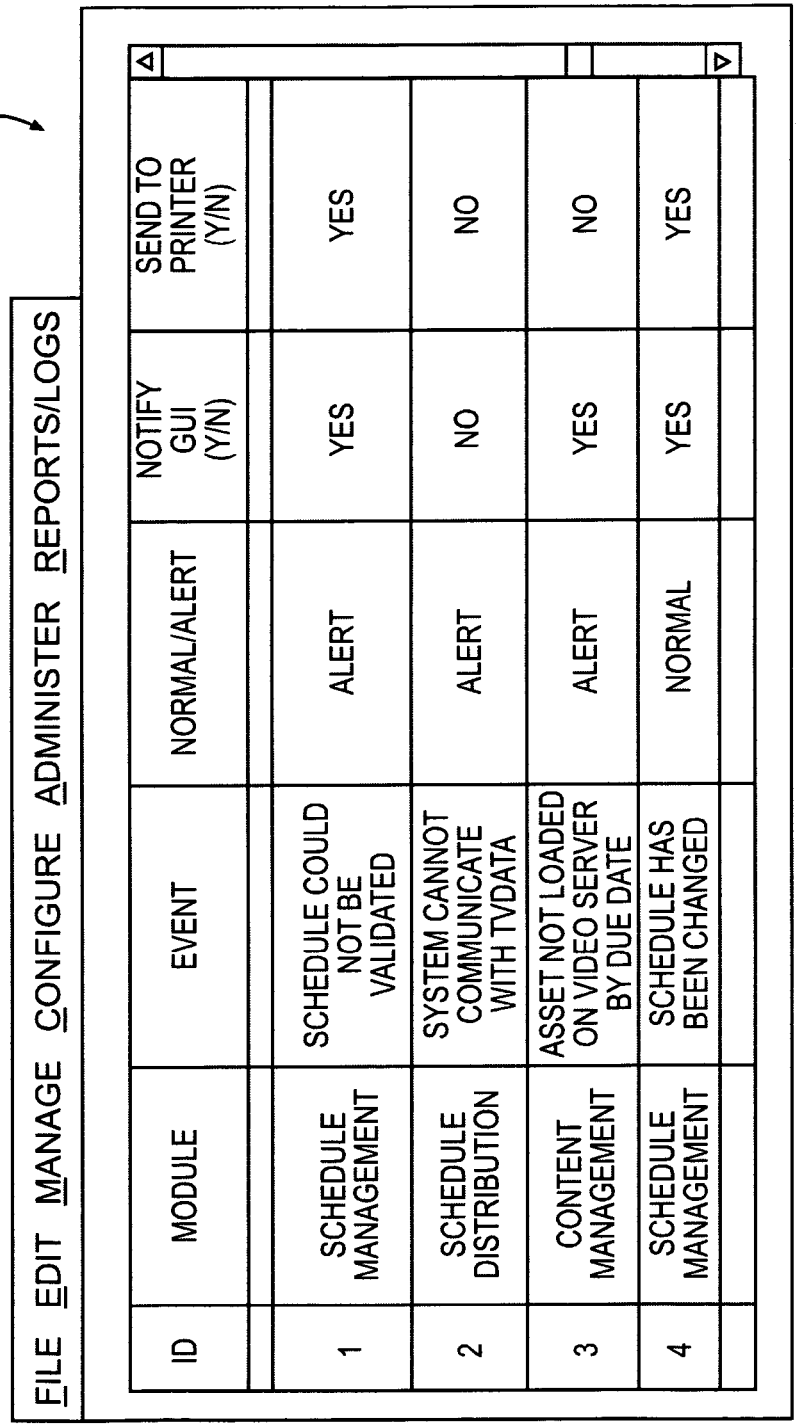
FIG. 33 illustrates a GUI screen for editing event notifications.

FIG. 33 illustrates a GUI screen 306 for editing event notifications, through which the administrator may enter and alter the status and conditions by which the event notification generator 80 responds to alert conditions. Through the GUI screen 306, the type of notification may be specified as normal or alert. A normal notification may be a pop-up dialog box or text on the screen which is generated upon occurrence of the corresponding condition, such as a change in a schedule, which may be of interest to the administrator.

Alert conditions may include the occurrence of an abnormal condition which hinders the functions of the master scheduler 20 and/or the NVOD system 10, as well as any occurrence of the failure of a task to be completed, or if the master scheduler 20 determines if a task is in jeopardy of not being completed in time. For example, for schedule management, alert conditions occur when a schedule expected from the schedule provider 84 is unavailable by a certain date, or when a received schedule fails to be validated.

In schedule distribution, alert conditions arise when the various systems 60–82 of the master scheduler 20 fail to properly communicate with each other. In addition, alert conditions include the occurrence of errors while acquiring or distributing scheduling information, or when a distribution fails to start or complete by a certain date or time.

In asset management, alert conditions occur when the metadata of an asset is unavailable by a certain date as derived from a scheduled loading time of the corresponding asset, when an asset tape is not checked in by a certain date as derived from a scheduled loading time of the tape, or when an asset tape is not checked out by a predetermined number of days after the asset tape is due to be returned to the asset storage location 232.

For content management, alerts are generated when an asset is either not loaded onto or not unloaded from the video server 11 by a certain date. Also, such content management alerts may occur when an asset is mistakenly unloaded or is mistakenly loaded to a wrong location, or when an incorrect asset is loaded to the video server 11.

In addition, upon receipt of an asset metadata file, the video server content manager 68 may automatically execute a content loading procedure, which includes the steps of determining the availability of memory such as disk space sufficient for an entire video program on the video server 11 as well as the step of determining a location for storing an asset for an event on the video server 11. If such content cannot be accommodated, the event notification generator 80 generates a corresponding alert to the administrator indicating that the specific content may not be loaded.

Data management alerts may be generated when the master scheduler application is not operational, or when the database 82 reaches a certain low level of capacity which may indicate insufficient resources to meet broadcast schedules, such that fewer assets are available to subscribers 36 using the NVOD system 10, which may cause a loss of potential revenue. Alerts may also be generated for security management upon the detection of repeated unauthorized attempts to gain access to the master scheduler 20.

An alert notification may cause, through the GUI 92 at the video management unit 90, the generation of flashing lights, colors, animation, and/or windows; a synthesized audio message or warning tone; or a dialog box which requires acknowledgment or some response from the user in order to proceed.

By setting the NOTIFY GUI option through the GUI screen 306, an administrator may be notified by such dialog boxes through the GUI 92. Otherwise, the notification may be audio or flashing visuals as described above. The notification may also be sent to a printer or other hardcopy output devices, for example, as part of the reports 96.

Figure 34:
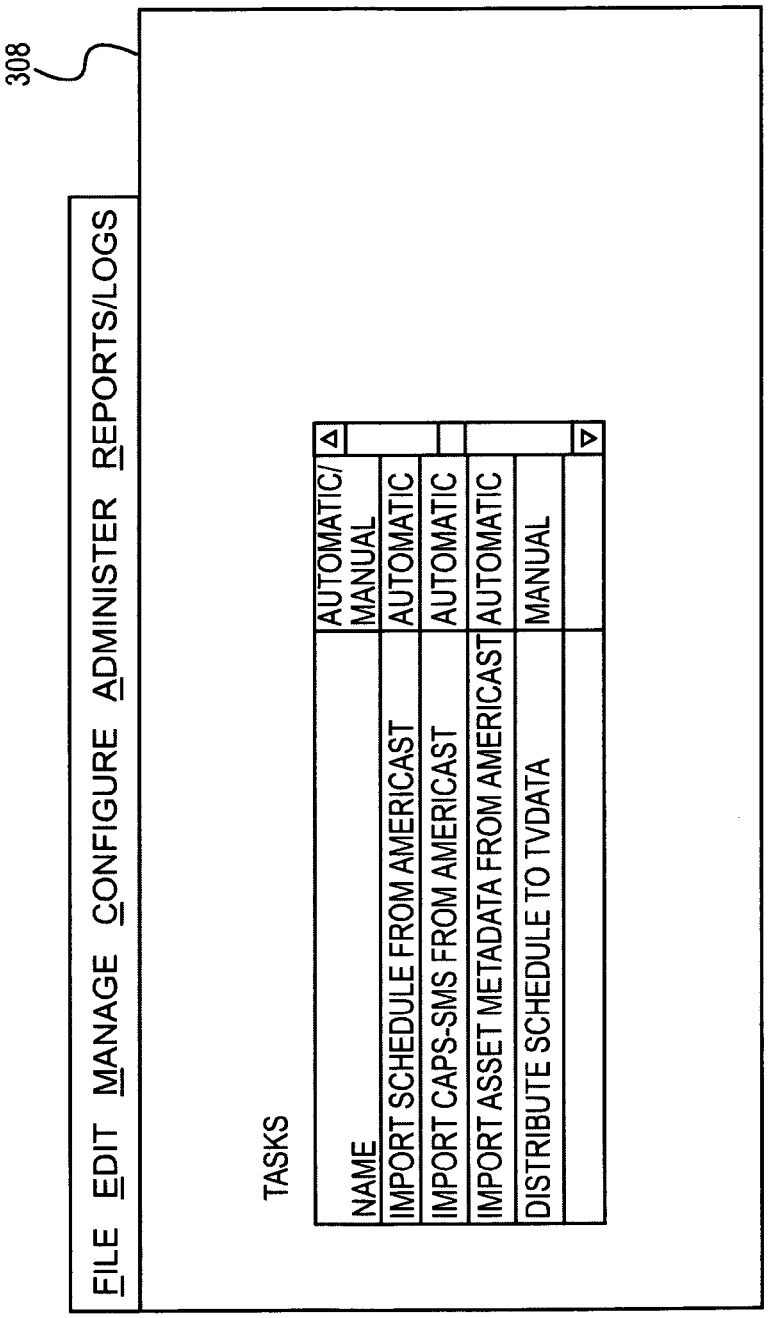
FIG. 34 illustrates a GUI screen for editing preferences and default settings.

FIG. 34 illustrates a GUI screen 308 for editing preferences and default settings, such as for automatic or manual tasks; that is, specified tasks may be performed automatically by the master scheduler 20 and/or the video server 11, or may be performed manually by a user such as an administrator with or without prompts or instructions generated by the task management system 72.

FIG. 35 illustrates a GUI screen 310 for managing tasks such as any tasks in a selectable range of dates. Such tasks may be grouped and sorted in a scrollable window according to functional area, description of the tasks, recommended start dates, estimated duration, and deadline date. The current status of the task may also be displayed with the actual start and end dates, and the current progress status.

Event Notification

The event notification generator 80 generates event notifications, including alerts and messages to the administrator, either through the GUI of the administrator interface 78, through an E-mail system, or through printed reports or messages using, for example, the report generator 74. The event notification generator 80 may be event driven, or may determine specific event conditions from polling of components of the master scheduler 20. Certain event conditions may be encountered, for example, when errors are found in schedule dates provided by the schedule provider 84 during validation, or when a specific item of content is not loaded onto the video server 11 within a specified time. When such event conditions occur, the event notification generator 80 notifies administrators and/or other designated personnel, such as troubleshooters.

The master scheduler 20 may be accessed by multiple users simultaneously, with authorized users such as system administrators being capable of modifying the operating parameters and data of the master scheduler 20. Remote users such as subscribers and monitoring personnel may access the master scheduler 20 to view scheduling data, but are not authorized to modify the scheduling data.

While the disclosed master scheduler system and method is particularly shown and described herein with reference to the preferred embodiments, it is to be understood that various modifications in form and detail may be made without departing from the scope and spirit of the present invention. Accordingly, modifications such as any examples suggested herein, but not limited thereto, are to be considered within the scope of the present invention.

What is claimed is:

1. A master scheduler arranged to control a near-video-on-demand (NVOD) system, the master scheduler comprising:
   a schedule management system arranged to receive and validate a schedule; and
   a content manager system arranged to monitor and control the loading of assets into a video server according to the validated schedule, wherein the assets include video content scheduled for staggered transmission to subscribers of the NVOD system using a plurality of channels, the plurality of channels including a test channel dedicated solely for testing a selected asset,
   wherein the content manager includes a graphical user interface configured to allow an administrator to view the selected asset using the test channel to verify the integrity of the selected asset loaded into the video server.

2. The master scheduler of claim 1 further comprising:
   a management processor including a graphic user interface (GUI), responsive to GUI-based commands from an administrator, arranged to interact with the content manager system to control the loading of the assets.

3. The master scheduler of claim 1 further comprising:
   a schedule distributor arranged to distribute a finalized schedule of programming events to external entities of the NVOD system, including the video server;
   where in the schedule management system, responsive to commands from an administrator, modifies the validated schedule to generate the finalized schedule of programming events.

4. The master scheduler of claim 1 further comprising:
   a head-end configuration manager, responsive to commands from an administrator, arranged to track configuration parameters of a head-end of the NVOD system, wherein the configuration parameters determine NVOD channel allocations.

5. The master scheduler of claim 1 further comprising:
   a task management system arranged to generate an indication of tasks to be performed to conduct the loading of assets to the video server.

6. The master scheduler of claim 5 further comprising:
   a notification generator, responsive to the occurrence of conditions associated with generated tasks, arranged to generate notifications of the conditions.

7. The master scheduler of claim 1 further comprising:
   an asset management system arranged to monitor the status and conditions of assets in the NVOD system.

8. The master scheduler of claim 7 further comprising:
   a graphic user interface (GUI) arranged to generate an asset management screen to allow an administrator to access the asset management system for viewing asset-related data.

9. A method for controlling a near-video-on-demand (NVOD) system, the method comprising the steps of:
   receiving a schedule from a schedule provider;
   validating the schedule;
   processing the schedule to generate a finalized schedule;
   receiving assets including content;
   loading the assets into a video server via a group of channels according to the finalized schedule, at least one of the group of channels includes a test channel dedicated solely for testing purposes;
   distributing the finalized schedule to the video server, to a business support system, and to an electronic program guide system; and
   transmitting the content using staggered transmission over a plurality of channels to subscribers of the NVOD system.

10. The method of claim 9 wherein the step of receiving assets includes the step of:
    cataloging the received assets using an asset management system.

11. The method of claim 9 further comprising the step of:
    generating a graphic user interface (GUI) screen to allow an administrator to monitor the loading of the assets into the video server.

12. The method of claim 11 further comprising the steps of:
    receiving an asset selection command through the GUI screen to select an asset loaded into the video server;
    receiving a test actuation signal through the GUI screen; and
    sending the asset to a display of an administrator over the test channel for viewing the selected asset.

13. A method for validation of scheduling information comprising:
    receiving at a master scheduler said scheduling information from a schedule provider;
    receiving an asset from an asset provider;
    loading said asset into a video server;
    verifying an integrity of said asset via a test channel, the test channel being dedicated solely for testing assets in said video server;
    obtaining asset information from said video server;
    comparing said asset information to said scheduling information;
    identifying a variance of said asset information to said scheduling information;
    modifying said scheduling information at said master scheduler to obtain modified scheduling information; and
    transmitting said modified scheduling information to a program guide system and to a business support system, said program guide system disseminating program guide information and said business support system generating billing information.

14. The method of claim 13 wherein said step of comparing asset information to said scheduling information comprises:
    comparing said asset information comprising measured duration information measured from said asset to said scheduling information comprising stored duration information.

15. The method of claim 13 wherein said step of comparing asset information to said scheduling information comprises:
    obtaining calculated duration information based on a difference between a scheduled start time and a scheduled end time;
    comparing said asset information comprising measured duration information measured from said asset to said calculated duration information.

16. The method of claim 13 wherein said step of comparing asset information to said scheduling information comprises:
    comparing said asset information comprising an asset return date to said scheduling information comprising a scheduled play date;
    said method further comprising:
    inhibiting playing of said asset if said scheduled play date is later than said asset return date.

17. The method of claim 13 further comprising:
receiving at said master scheduler program guide information from a program guide system;
comparing said program guide information to said scheduling information.

18. The method of claim 13 further comprising:
obtaining pricing information from said asset provider;
modifying said pricing information at said master scheduler to obtain modified pricing information;
transmitting said modified pricing information from said master scheduler to a business support system, said business support system generating billing information.

* * * * *